United States Patent
Tonami et al.

(10) Patent No.: US 7,106,476 B1
(45) Date of Patent: Sep. 12, 2006

(54) IMAGE PROCESSING METHOD, IMAGE PROCESSING APPARATUS, IMAGE FORMING METHOD AND RECORDING MEDIUM

(75) Inventors: Kazunari Tonami, Kanagawa (JP); Hiroshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 856 days.

(21) Appl. No.: 09/722,270

(22) Filed: Nov. 28, 2000

(30) Foreign Application Priority Data

Dec. 13, 1999 (JP) .................................. 11-353625

(51) Int. Cl.
*H04N 1/40* (2006.01)

(52) U.S. Cl. ............... 358/1.9; 358/3.01; 358/3.05; 358/3.21; 382/252

(58) Field of Classification Search ................ 358/1.9, 358/2.99, 3.01, 3.03, 3.05, 3.06, 3.09, 3.12, 358/3.21, 3.24; 382/237, 251, 252
See application file for complete search history.

(56) References Cited

U.S. PATENT DOCUMENTS

| | | | |
|---|---|---|---|
| 5,748,336 A | * | 5/1998 | Kakutani .................. 382/252 |
| 5,917,614 A | * | 6/1999 | Levien ....................... 358/3.03 |
| 6,160,921 A | * | 12/2000 | Marcu ........................ 382/252 |
| 6,169,608 B1 | * | 1/2001 | Yoshida ....................... 358/1.9 |

FOREIGN PATENT DOCUMENTS

| | | |
|---|---|---|
| JP | 01-130945 | 5/1989 |
| JP | 01130946 A | 5/1989 |
| JP | 01276969 A | 11/1989 |
| JP | 03034680 A | 2/1991 |
| JP | 03276966 A | 12/1991 |
| JP | 06-125456 | 5/1994 |
| JP | 07-038746 | 2/1995 |
| JP | 07-312688 | 11/1995 |

* cited by examiner

*Primary Examiner*—Thomas D. Lee
(74) *Attorney, Agent, or Firm*—Dickstein Shapiro LLP

(57) ABSTRACT

An image forming method includes the steps of a) multi-level quantizing a multi-tone image by an error diffusion method, and b) representing each pixel of the thus-quantized image having a quantized level higher than 0 using a dot which is larger as the quantized level thereof is higher. Occurrence of dots having a specific size is repressed in a specific shade region relating to the dots.

37 Claims, 19 Drawing Sheets

FIG.14

| OUTPUT MODE | A | B |
|---|---|---|
| CHARACTER MODE | 255 | 255 |
| PHOTOGRAPH MODE | 30 | 100 |
| CHARACTER/PHOTOGRAPH MODE | 30 | 150 |
| PRINTED PHOTOGRAPH MODE | 60 | 255 |

IMAGE PROCESSING METHOD, IMAGE PROCESSING APPARATUS, IMAGE FORMING METHOD AND RECORDING MEDIUM

BACKGROUND OF THE INVENTION

1. Field of the Invention

The present invention generally relates to an image forming method, an image processing method and an image processing apparatus using an error diffusion method in multi-level quantization for multi-tone images.

2. Description of the Related Art

For example, in laser printers, digital copiers, display devices, and other various image processing apparatuses, an error diffusion method has been widely used for falsely reproduicng tones of multi-tone images.

With regard to the error diffusion method, the following various improvements have been proposed:

(1) In a system in which image data is two-level quantized according to the error diffusion method, in order to improve continuity of characters and figures, a configuration (continuity) of ON dots output in the periphery of a target pixel is examined, and a quantization threshold is controlled so that an output dot of the target pixel is easily to generate an ON dot when ON dots continue in a certain direction (Japanese Patent Publication No. 8-24338);

(2) In a system in which image data is two-level quantized according to the error diffusion method, in order to prevent a peculiar texture due to close placement of ON dots due to error diffusion in a positive direction from occurring in a light shade portion, a quantization threshold is controlled so that an output dot of a target pixel is determined to be an OFF dot when ON dots are output in the periphery of the target dot in a light shade portion (Japanese Patent No. 2662402); and (3) Continuity of output dots in the periphery of a target pixel is examined, and a quantization threshold is controlled so that continuity of ON dots or OFF dots is avoided so that chain-like textures and false contours are prevented from being generated (Japanese Patent No. 2756308).

SUMMARY OF THE INVENTION

Although various improvements have been proposed so as to make up for problems of the error diffusion method, an object of the present invention is to provide novel method and apparatus for solving problems of the error diffusion method by an approach different from those technologies.

Specifically, as will be described in detail, in a case where multi-tone image data is multi-level quantized according to ordinary error diffusion, and the thus-obtained quantized data is provided to an electrophotographic printer, for example, so that an image is formed therefrom, the image easily becomes unstable in medium and dark shade regions, tonality skipping easily occurs, saturation of shade easily occurs early, and so forth. Further, in a case where images in which character regions, halftone-dot regions and photograph regions are mixed are handled, image quality may be degraded depending on particular regions. Accordingly, an object of the present invention is to provide novel image forming method, image processing method and image processing apparatus in order to solve these problems.

An image forming method, according to the present invention, comprises the steps of:

a) multi-level quantizing a multi-tone image by an error diffusion method; and b) representing each pixel of the thus-quantized image having a quantized level higher than 0 using a dot which is larger as the quantized level thereof is higher, wherein occurrence of dots having a specific size is repressed in a specific shade region relating to the dots.

Thereby, by repressing occurrence of dots which result in degrading stability, graininess and tonality of images, it is possible to form images in high quality.

Further, occurrence of the smallest dots may be repressed.

Thereby, it is possible to achieve both satisfactory graininess and stability for light and medium shade regions.

Occurrence of the dots other than the largest dots may be repressed.

Thereby, it is possible to achieve satisfactory graininess for light shade regions, satisfactory stability, graininess and tonality for medium shade regions, and satisfactory stability and tonality for dark shade regions.

An occurrence rate of the dots having the specific size may be controlled based on the number of dots in a specific region in the periphery of a target pixel.

Thereby, it is possible to, based on the number of dots in the periphery of a target pixel, control a occurrence rate of specific dots so that a mixing rate of dots changes smoothly with respect to tonality change, thereby, it is possible to perform tonality representation with the most suitable dot occupancy rate, and, also, to form smooth images with a little tonality skipping or incongruity at positions at which size of dots is switched.

An occurrence rate of the dots having the specific size may be controlled based on the number of dots in a specific region in the periphery of a target pixel and a shade level of the target pixel.

Thereby, it is possible to suitably control a dot occurrence rate in consideration to the shade level of a target pixel, and to perform tonality representation with the most suitable dot occupancy rate.

An occurrence rate of the dots having the specific size may be controlled based on the number of dots having a specific size in a specific region in the periphery of a target pixel.

An occurrence rate of the dots having the specific size may be controlled based on the number of dots having a specific size in a specific region in the periphery of a target pixel and a shade level of the target pixel.

Thereby, it is possible to perform control such that, in a case of 4-level quantization, even when many large dots exist in the periphery of a target pixel, an occurrence rate of the smallest dots is not reduced when other dots are few. Accordingly, it is possible to form images with a little baggy at character (or letter) portions or edge portions of images and satisfactory sharpness.

A degree of repressing occurrence of the dots having the specific size may be changed according to a feature of the image.

Thereby, it is possible to repress occurrence of dots in an appropriate degree for various images having different features, and to perform tonality representation with an appropriate dot occupancy rate.

Occurrence of the dots having the specific size may be repressed only for a picture region of the image.

Thereby, it is possible to improve stability and tonality for picture regions of images.

The degree of repressing occurrence of the dots having the specific size may be made weaker for a character region of the image than for a picture region of the image.

Thereby, it is possible to form images in which character regions and picture regions are mixed, character regions having satisfactory sharpness and picture regions having satisfactory stability and tonality.

Occurrence of the dots having the specific size may be repressed only for a non-edge region of the image.

Thereby, it is possible to improve sharpness for edge regions of images, and to improve stability and tonality for non-edge regions.

Repressing of occurrence of the dots having the specific size may be performed for a medium shade region of the image.

Thereby, it is possible to form images having satisfactory graininess in light shade regions, and satisfactory stability and tonality in medium shade regions.

Repressing of occurrence of the dots having the specific size may be performed for a dark shade region of the image.

Thereby, it is possible to form images having satisfactory graininess in light shade regions, and satisfactory stability and tonality in dark shade regions.

Repressing of occurrence of the dots having the specific size may be performed for medium and dark shade regions of the image.

Thereby, it is possible to form images having satisfactory graininess in light shade regions, and satisfactory stability and tonality in medium and dark shade regions.

An image processing method, according to another aspect of the present invention, comprises the steps of:

a) multi-level quantizing multi-level input image data; and b) repressing occurrence of one or more specific quantized levels for a specific level region of the image data relating to the one or more specific quantized levels.

Re-quantization may be performed for the one or more specific quantized levels, occurrence of which is to be repressed.

By multi-level quantizing multi-level input image data through this image processing method, and representing it using dots for pixels which dots are larger as the pixels have higher quantized levels, it is possible to form high-quality images according to the image forming method described above.

Occurrence of the one or more specific quantized levels may be repressed for a medium level region of the image data.

Occurrence of the one or more specific quantized levels may be repressed for a high level region of the image data.

Occurrence of the one or more specific quantized levels may be repressed for medium and high level regions of the image data.

An occurrence rate(s) of the quantized level(s), occurrence of which is to be repressed, may be controlled based on the number of pixels quantized to be higher than quantized level 0 in a specific region in the periphery of a target pixel.

An occurrence rate(s) of the quantized level(s), occurrence of which is to be repressed, may be controlled based on the number of pixels quantized to be higher than the quantized level 0 in a specific region in the periphery of a target pixel and the level of the image data of the target pixel.

An occurrence rate(s) of the quantized level(s), occurrence of which is to be repressed, may be controlled based on the number of pixels quantized to a specific quantized level in a specific region in the periphery of a target pixel.

An occurrence rate(s) of the quantized level(s), occurrence of which is to be repressed, may be controlled based on the number of pixels quantized to a specific quantized level in a specific region in the periphery of a target pixel and the level of the image data of the target pixel.

A degree(s) of repressing occurrence of the one or more specific quantized levels may be changed according to a feature of the image.

Occurrence of the one or more specific quantized levels may be repressed only for a picture region of the image.

The degree(s) of repressing occurrence of the one or more specific quantized levels may be made weaker for a character region of the image than for a picture region of the image.

Occurrence of the one or more specific quantized levels may be repressed only for a non-edge region of the image.

Re-quantization may be performed for the one or more specific quantized levels, occurrence of which is to be repressed.

An image forming method, according to another aspect of the present invention, comprises the steps of:

a) multi-level quantizing multi-level input image data by the image processing method as described above; and b) forming an image from the thus-multi-level-quantized image data using dots for pixels which dots are larger as the pixels have higher quantized levels.

An image processing apparatus, according to the present invention, comprises:

a first part multi-level quantizing multi-tone mage data; and a second part repressing occurrence of one or more specific quantized levels for a specific level region of the image data relating to the one or more specific quantized levels.

Thereby, it is possible to perform multi-level quantization of multi-level input image data by the above-described image processing method. Accordingly, by providing the output image data to an image forming part which forms images using dots for pixels which dots are larger as the pixels have higher quantized levels, it is possible to form high-quality images according to the above-described image forming method.

The second part may perform re-quantization for the one or more specific quantized levels, occurrence of which is to be repressed.

The second part may repress occurrence of the one or more specific quantized levels for a medium level region of the image data.

The second part may repress occurrence of the one or more specific quantized levels for a high level region of the image data.

The second part may repress occurrence of the one or more specific quantized levels for medium and high level regions of the image data.

The second part may control an occurrence rate(s) of the quantized level(s), occurrence of which is to be repressed, based on the number of pixels quantized to be higher than the quantized level 0 in a specific region in the periphery of a target pixel.

The second part may control an occurrence rate(s) of the quantized level(s), occurrence of which is to be repressed, based on the number of pixels quantized to be higher than the quantized level 0 in a specific region in the periphery of a target pixel and the level of the image data of the target pixel.

The second part may control an occurrence rate(s) of the quantized level(s), occurrence of which is to be repressed, based on the number of pixels quantized to a specific quantized level in a specific region in the periphery of a target pixel.

The second part may control an occurrence rate(s) of the quantized level(s), occurrence of which is to be repressed, based on the number of pixels quantized to a specific quantized level in a specific region in the periphery of a target pixel and the level of the image data of the target pixel.

The second part may change a degree(s) of repressing occurrence of the one or more specific quantized levels according to a feature of the image.

The second part may repress occurrence of the one or more specific quantized levels only for a picture region of the image.

The second part may make the degree(s) of repressing occurrence of the one or more specific quantized levels weaker for a character region of the image than for a picture region of the image.

The second part may repress occurrence of the one or more specific quantized levels only for a non-edge region of the image.

The second part may change a degree(s) of repressing occurrence of the one or more specific quantized levels according to a specified output mode.

Thereby, it is possible to change a degree(s) of repressing occurrence of one or more specific quantized levels by selecting the output mode, and, thereby, to form various types of images to have high quality.

The second part may perform re-quantization for the one or more specific quantized levels, occurrence of which is to be repressed.

An image processing apparatus, according to another aspect of the present invention, comprises:

a first part adding an error to input image data;

a second part multi-level quantizing the image data to which the error is already added by the first part, using a plurality of quantization thresholds;

a third part re-quantizing the quantized data into another quantized level, provided by the second part, for one or more specific quantized levels other than the highest quantized level and quantized level 0, as the need arises, and outputting the thus-obtained data as an output image data;

a fourth part obtaining the error to be added to the input image data, from the output image data and image data to which the error is already added by the first part, and providing the thus-obtained error to the first part; and a fifth part detecting, from the output image data, the number of pixels quantized to the quantized levels equal to or higher than the quantized level 1 in a specific region in the periphery of a target pixel, and providing the thus-obtained number to the third part, wherein the third part compares a threshold relating to each of the one or more specific quantized levels determined based on the number provided by the fifth part, with the level of the image data to which the error is already added, and, thereby, determines whether re-quantization for the each of the one or more specific quantized levels is necessary, occurrence of each of the one or more specific quantized levels being repressed in a specific level region of the input image data relating to the each of the one or more specific quantized levels through the re-quantization by the third part.

Thereby, it is possible to perform multi-level quantization of multi-tone image data by the above-described image processing method. Accordingly, by providing the output image data to an image forming part which forms images using dots for pixels which dots are larger as the pixels have higher quantized levels, it is possible to form high-quality images according to the above-described image forming method.

The third part may determine that re-quantization is not necessary when the level of the input image data is out of the specific level region relating to each of the one or more specific quantized levels.

Thereby, it is possible to exclude a target pixel not having a intermediate level which occurs less frequently in high-contrast images such as those of general business documents, from object of re-quantization, to reduce the process time, and, also, to prevent line cut-out of low-contrast characters (letters).

An image processing apparatus, according to another aspect of the present invention, comprises:

a first part adding an error to input image data;

a second part multi-level quantizing the image data to which the error is added by the first part, using a plurality of quantization thresholds;

a third part re-quantizing the quantized data provided by the second part, into another quantized level, for one or more specific quantized levels other than the highest quantized level and quantized level 0, as the need arises, and outputting the thus-obtained data as an output image data;

a fourth part obtaining the error to be added to the input image data, from the output image data and the image data to which the error is already added by the first part, and providing the thus-obtained error to the first part; and a fifth part detecting, from the output image data, the number of pixels quantized to the quantized levels equal to or higher than the quantized level 1 in a specific region in the periphery of a target pixel, and providing the thus-obtained number to the third part, wherein the third part compares a threshold relating to each of the one or more specific quantized levels determined based on the number provided by the fifth part and the level of the input image data, with the level of the image data to which the error is already added, and, thereby, determines whether re-quantization for the each of the one or more specific quantized levels is necessary, occurrence of each of the one or more specific quantized levels being repressed in a specific level region of the input image data relating to the each of the one or more specific quantized levels through the re-quantization by the third part.

Thereby, it is possible to perform multi-level quantization of multi-tone image data by the above-described image processing method. Accordingly, by providing the output image data to an image forming part which forms images using dots for pixels which dots are larger as the pixels have higher quantized levels, it is possible to form high-quality images according to the above-described image forming method.

An image processing apparatus, according to another aspect of the present invention, comprises:

a first part adding an error to input image data;

a second part multi-level quantizing the image data to which the error is added by the first part, using a plurality of quantization thresholds;

a third part re-quantizing the quantized data provided by the second part, into another quantized level, for one or more specific quantized levels other than the highest quantized level and quantized level 0, as the need arises, and outputting the thus-obtained data as an output image data;

a fourth part obtaining the error to be added to the input image data from the output image data and the image data to which the error is already added by the first part, and providing the thus-obtained error to the first part; and a fifth part detecting, from the output image data, the number of pixels for each quantized level in a specific region in the periphery of a target pixel, and providing the thus-obtained number to the third part, wherein the third part compares a threshold relating to each of the one or more specific quantized levels determined based on the total number of pixels of each of the one or more specific quantized levels and one or more other quantized levels near the each of the one or more specific quantized levels and the level of the input image data, with the level of the image data to which the error is already added, and, thereby, determines whether re-quantization for the each of the one or more specific quantized levels is necessary, occurrence of each of the one or more specific quantized levels being repressed in a specific level region of the input image data relating to the each of the one or more specific quantized levels through the re-quantization by the third part.

Thereby, it is possible to perform multi-level quantization of multi-tone image data by the above-described image processing method. Accordingly, by providing the output image data to an image forming part which forms images using dots for pixels which dots are larger as the pixels have higher quantized levels, it is possible to form high-quality images according to the above-described image forming method.

An image processing apparatus, according to another aspect of the present invention, comprises:

a first part adding an error to input image data;

a second part multi-level quantizing the image data to which the error is added by the first part, using a plurality of quantization thresholds;

a third part re-quantizing the quantized data provided by the second part, into another quantized level, for one or more specific quantized levels, as the need arises, and outputting the thus-obtained data as an output image data;

a fourth part obtaining the error to be added to the input image data, from the output image data and image data to which the error is already added by the first part, and providing the thus-obtained error to the first part; and a fifth part detecting, from the output image data, the number of pixels quantized to the quantized levels equal to or higher than the quantized level 1 in a specific region in the periphery of a target pixel, and providing the thus-obtained number to the third part, wherein the third part has a signal indicating a feature of an image region to which the target pixel belongs input thereto externally, and compares a threshold relating to each of the one or more specific quantized levels determined based on a parameter relating to the each of the one or more specific quantized levels determined according to the feature indicated by the signal, the number provided by the fifth part and the level of the input image data, with the level of the image data to which the error is already added, and, thereby, determines whether re-quantization for the each of the one or more specific quantized levels is necessary, occurrence of each of the one or more specific quantized levels being repressed in a degree according to said feature in a specific level region of the input image data relating to the each of the one or more specific quantized levels through the re-quantization by the third part.

Thereby, it is possible to perform multi-level quantization of multi-tone image data by the above-described image processing method. Accordingly, by providing the output image data to an image forming part which forms images using dots for pixels which dots are larger as the pixels have higher quantized levels, it is possible to form high-quality images according to the above-described image forming method.

The signal may indicate whether the image region to which the target pixel belongs is a character region or a picture region; and the parameter relating to each of the one or more specific quantized levels may be determined such that occurrence of the each of the one or more specific quantized levels is repressed only for the picture region.

The signal may indicate whether the image region to which the target pixel belongs is a character region or a picture region; and the parameter relating to each of the one or more specific quantized levels may be determined such that a degree of repressing occurrence of the each of the one or more specific quantized levels is weaker for the character region than for the picture region.

The signal may indicate whether the image region to which the target pixel belongs is an edge region or a non-edge region; and the parameter relating to each of the one or more specific quantized levels may be determined such that occurrence of the each of the one or more specific quantized levels is repressed only for the non-edge region An image processing apparatus, according to another aspect of the present invention, comprises:

a first part adding an error to input image data;

a second part multi-level quantizing the image data to which the error is added by the first part, using a plurality of quantization thresholds;

a third part re-quantizing the quantized data provided by the second part into another quantized level, for one or more specific quantized levels, as the need arises, and outputting the thus-obtained data as an output image data;

a fourth part obtaining the error to be added to the input image data, from the output image data and image data to which the error is already added by the first part, and providing the thus-obtained error to the first part; and a fifth part detecting, from the output image data, the number of pixels quantized to the quantized levels equal to or higher than the quantized level 1 in a specific region in the periphery of a target pixel, and providing the thus-obtained number to the third part, wherein the third part has a signal indicating an output mode input from the outside, and compares a threshold relating to each of the one or more specific quantized levels determined based on a parameter relating to the each of the one or more specific quantized levels determined according to the output mode indicated by the signal, the number provided by the fifth part and the level of the input image data, with the level of the image data to which the error is already added, and, thereby, determines whether re-quantization for the each of the one or more specific quantized levels is necessary, occurrence of each of the one or more specific quantized levels being repressed in a degree according to said output mode in a specific level region of the input image data relating to the each of the one or more specific quantized levels through the re-quantization by the third part.

Thereby, it is possible to perform multi-level quantization of multi-tone image data by the above-described image processing method. Accordingly, by providing the output image data to an image forming part which forms images using dots for pixels which dots are larger as the pixels have higher quantized levels, it is possible to form high-quality images according to the above-described image forming method.

Further, it is possible to change a degree(s) of repressing occurrence of one or more specific quantized levels by selecting the output mode, and, thereby, to form various types of images to have high quality The second part may perform 4-level quantization;

the re-quantization performed by the third part may be performed for the quantized level 1; and occurrence of the quantized level 1 may be repressed for a medium level region of the input image data.

The second part may perform 4-level quantization;

the re-quantization performed by the third part may be performed for the quantized level 1 and quantized level 2;

occurrence of the quantized level 1 may be repressed in a medium level region of the input image data; and occurrence of the quantized level 2 may be repressed in a high level region of the input image data.

The image processing apparatus may further comprise a sixth part generating the signal input to the third part.

The image processing apparatus may further comprise a sixth part which forms, from the image output data, an image using dots for pixels which dots are larger as the pixels have higher quantized levels.

The image processing apparatus may further comprise a sixth part generating the input image data by optically scanning an original.

The image processing apparatus may further comprise:

a sixth part generating the input image data by optically scanning an original; and a seventh part forming, from the image output data, an image using dots for pixels which dots are larger as the pixels have higher quantized levels.

Thereby, it is possible to achieve a printer, a display, a scanner, a facsimile machine and a digital copier, which handle multi-tone images, and provide high image quality.

A computer-readable recording medium, according to the present invention, stores therein a program for causing a computer to carry out the function of each part of the image processing apparatus described above.

Thereby, it is possible to easily achieve the image processing apparatus described above using a general-purpose or special purpose computer.

Other objects and further features of the present invention will become more apparent from the following detailed description when read in conjunction with the accompanying drawings.

BRIEF DESCRIPTION OF THE DRAWINGS

FIG. 14 illustrates selectable output modes and corresponding values of parameters A and B in the image processing apparatus according to the present invention;

Figures 19A, 19B, 19C, 19D:
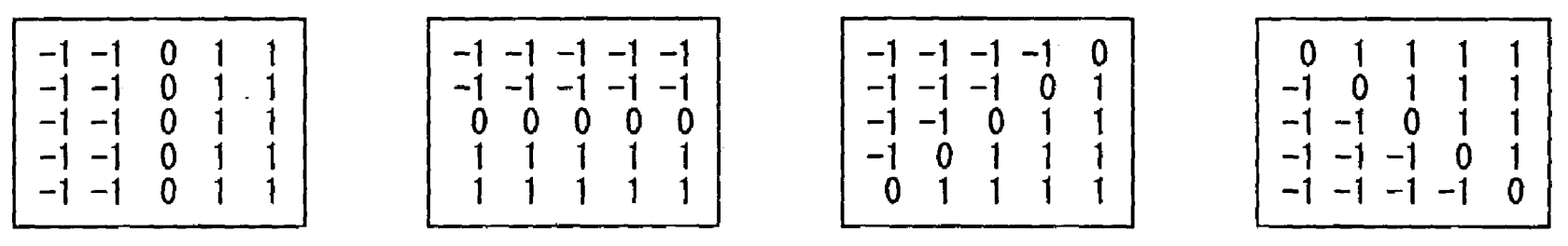

FIGS. 19A, 19B, 19C and 19D show one example of differential filters for edge detection.

DETAILED DESCRIPTION OF THE PREFERRED EMBODIMENTS

Figure 1:
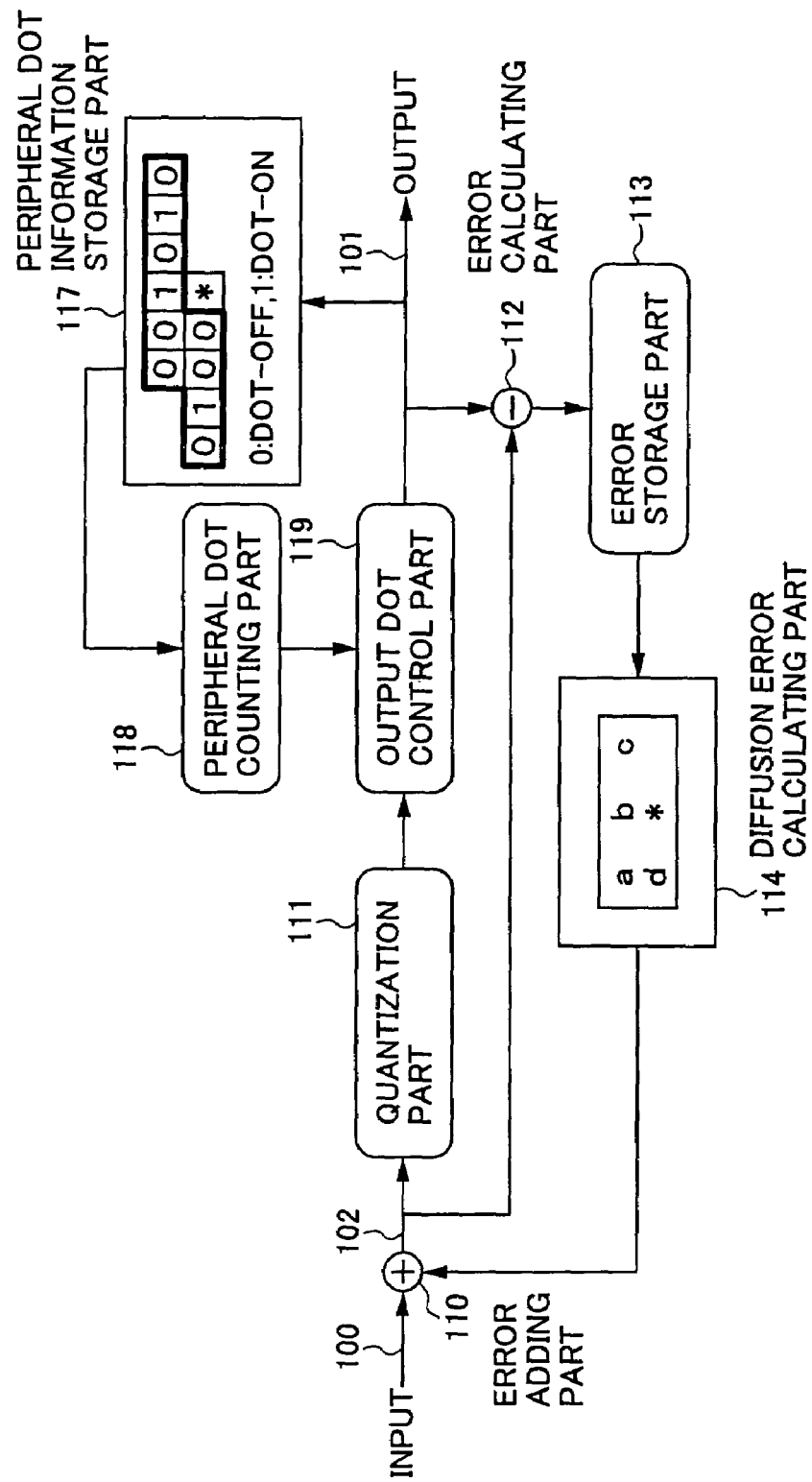
FIG. 1 is a block diagram showing one example of a block configuration of an image processing apparatus according to the present invention.

Image processing apparatuses in embodiments of the present invention will now be described with reference to accompanying drawings.

By the image processing apparatuses according to the present invention which will be described, image processing methods according to the present invention can be put into practice, and, also, image formation can be performed when output image data obtained from the image processing apparatuses are provided to image forming parts which form images by using dots which are larger for pixels having higher quantized levels.

In order to avoid duplication of description, the same reference numerals are given to the same parts or corresponding parts through a plurality of drawings.

First Embodiment

An image processing apparatus in a first embodiment of the present invention has a block configuration shown in FIG. 1, and, basically, quantizes input image data 100 of 8 bits/pixel into four levels, i.e., 0, 1, 2 and 3, according to an error diffusion method, and outputs thus-quantized data as output image data 101. The output values corresponding to the quantized levels 0, 1, 2 and 3 are 0, 85, 170, 255 (decimal notation), respectively.

Basic parts for such four-level quantization according to the error diffusion method are an error adding part 110 which adds a diffusion error to the input image data 100, a quantization part 111 which outputs the quantized levels 0, 1, 2 and 3 by comparing the image data to which the diffusion error is thus already added by the error adding part 110, with three quantization thresholds T1, T2 and T3 (T1<T2<T3), an error calculating part 112 which calculates an error between the output image data 101 and image data 102 to which the error is thus already added, an error storage part 113 which temporarily stores the thus-calculated error, and a diffusion error calculating part 114 which calculates the diffusion error for a pixel (target pixel) to be processed subsequently, using the error data stored in the error storing part 113 and provides the diffusion error to the error adding part 102.

The above-mentioned quantization thresholds T1, T2 and T3 are determined to be approximately intermediate values between adjacent two quantized levels, and, for example, T1=43, T2=128, and T3=213.

In the first embodiment, as indicated by the inside of the block of the diffusion error calculating part 114, * (asterisk) indicates a position of a target pixel, errors calculated for pixels at respective positions of 'a', 'b' and 'c' on the immediately preceding line and the pixel at the immediately preceding position 'd' on the same line of the target pixel are used for calculating the diffusion error for the target pixel.

The diffusion error calculating part 114 multiplies the errors calculated for the pixels at the above-mentioned positions 'a', 'b', 'c' and 'd' with coefficients 1, 5, 3 and 7, respectively, and the sum of the thus-obtained values is divided by 16. The thus-obtained value is output as the diffusion error for the target pixel (*) by the diffusion error calculating part 114.

Accordingly, as the error storage part 113, a line memory having two lines is used, for example.

Further, the above-mentioned configuration and number of pixels in the periphery of the target pixel to be referred to for calculating the diffusion error can be changed, and, also, the above-mentioned coefficients for the errors of those pixels can be changed.

Further, the following configuration can also be employed, instead: A calculating part corresponding to the diffusion error calculating part 114 is provided between the error calculating part 112 and error storage part 113, the diffusion errors for not-yet-processed peripheral pixels are re-calculated one by one by this calculating part using the errors calculated by the error calculating part 112 and error data stored in the error storage part 113, the error data stored in the error storage part 113 is updated by this calculation result, and the diffusion error for the pixel to be processed subsequently is read directly from the error storage part 113 and is provided to the error adding part 110.

In the image processing apparatus in the first embodiment, in addition to those basic parts for the four-level error diffusion process described above, a peripheral dot information storage part 117, a peripheral dot counting part 118, and an output dot control part 119 are provided, and, thereby, one which is obtained through re-quantization as the need arises by the output control part 119 for specific quantization level(s) is output as the output image data 101. It is also possible to integrate the output dot control part 119 with the quantization part 111.

The peripheral dot information storage part 117 temporarily stores dot information expressed by 1 bit/pixel as to whether each already quantized pixel within a fixed region in the periphery of a target pixel has the quantized level 0 or more than 0.

An image forming method according to the present invention can be put into practice as a result of the output image data 101 being provided to an image forming apparatus such as an electrophotographic printer which forms images by using larger dots for pixels having higher quantized levels.

In this case, no dot is formed for a pixel having the quantized level of 0, and a dot having a size according to the quantized level is formed for a pixel having the quantized level more than 0.

Accordingly, in the specification and claims, a pixel having the quantized level 0 in the output image data 101 may be referred to as an OFF-dot, and a pixel having the quantized level more than 0 may be referred to as an ON-dot. By using this expression, in the peripheral dot information storage part 117, a pixel of OFF dot is represented by "0", and a pixel of ON dot is represented by "1", for example.

The peripheral dot counting part 118 refers to the dot information stored in the peripheral dot information storage part 117, and counts the number of ON dots in the specific region in the periphery of a target pixel.

In the first embodiment, assuming that * (asterisk) shown inside of the block of the peripheral dot information storage part 117 indicates a position of a target pixel to be processed, the number of ON dots (the number of peripheral dots) is counted for the peripheral ten pixels shown in the block in the figure. Accordingly, as the peripheral dot information storage part 117, a line memory having two lines is used, for example.

That is, in the first embodiment, the peripheral dot counting part 118 and peripheral dot information storage part 117 are used for detecting the number of pixels which have been quantized to the quantized levels more than 0 for the specific region in the periphery of a target pixel. The number and configuration of pixels in the periphery of a target pixel for which dot information is referred to by the peripheral dot counting part 118 can be changed as the need arises.

Figure 2:
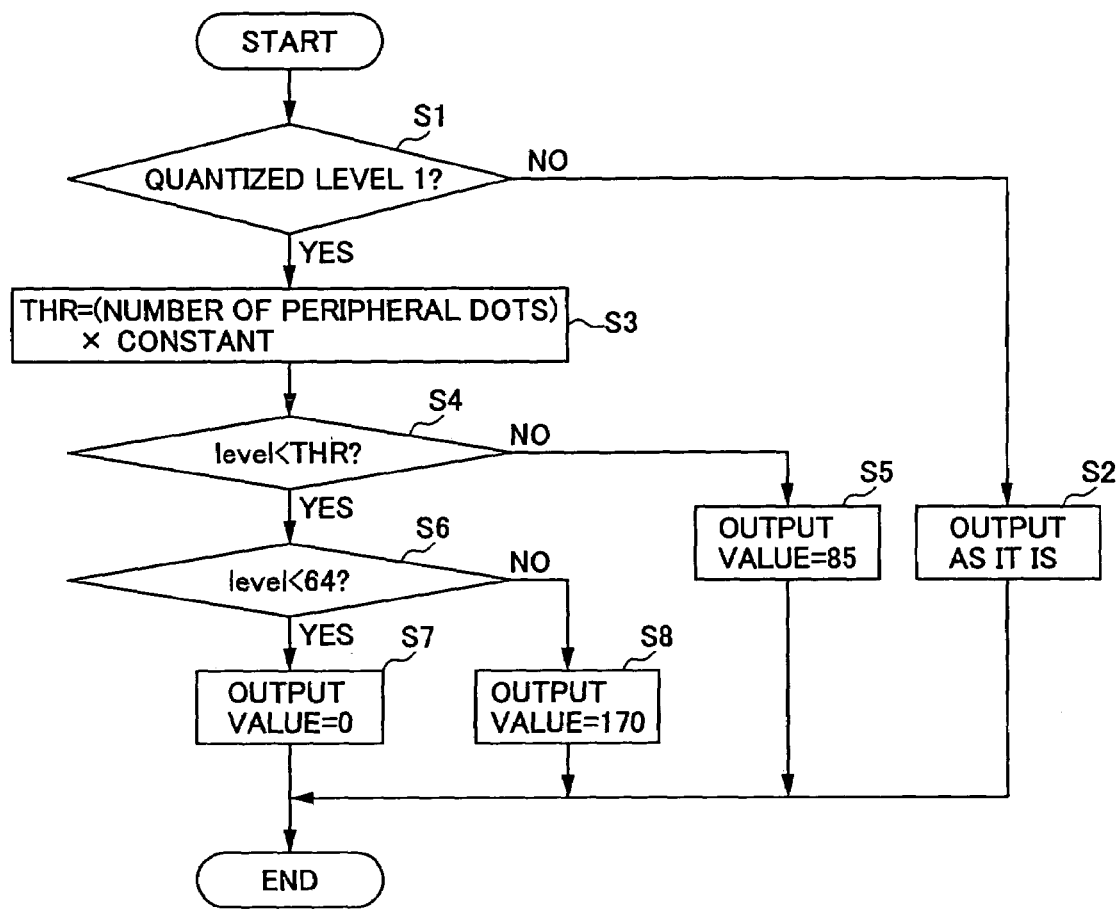
FIG. 2 is a flow chart showing one example of processing performed by an output dot control part of the image processing apparatus according to the present invention.

The output dot control part 119 has the input data (the image data 102 after having the error added thereto) of the quantization part 111, the quantization output of the quantization part 111, and the number of peripheral dots counted by the peripheral dot counting part 118 input thereto, and executes the process shown in FIG. 2.

This process will now be described with reference to FIG. 2.

First, in a step S1, it is determined whether or not the quantization output of the quantization part 111 for a target pixel is the quantized level 1 (output value: 85). Then, when it is not the quantized level 1, the quantization output of the quantization part 111 is output as it is (in a step S2).

When the quantization output of the quantization part 111 is the quantized level 1, a threshold THR is determined (in a step S3). In the first embodiment, the threshold THR is calculated using the number ('count') of peripheral dots counted by the peripheral dot counting part 118 and a constant by the following equation:

$$THR = count \times constant$$

For example, the constant is determined to be 10.

Then, it is determined in a step S4 whether or not the level ('level', the level of the image data 102) is smaller than the threshold THR. When it is not smaller than the threshold THR, the quantization output of the quantization part 111 is output as it is (in a step S5). That is, for the current target pixel, it is determined that re-quantization of the quantized level 1 is not necessary. As the number of ON dots in the periphery of the target pixel increases, the threshold THR increases, and a rate of being determined that re-quantization is not necessary decreases. Accordingly, the quantization level 1 comes to be not easily output.

When the target pixel level 'level' is smaller than the threshold THR, it is determined that re-quantization is necessary, and the target pixel level 'level' is compared with a threshold relating to the quantized level 1, and, thereby, re-quantization is performed. In the first embodiment, it is determined in a step S6 whether or not the target pixel level 'level' is smaller than 64 which is an approximately intermediate value between the quantization threshold T1 and the output value 85 of the quantized level 1. Then, when the target pixel level 'level' is smaller than 64, the quantized level 0 (output value: 0) is output (in a step S7). However, when the target pixel level 'level' is not smaller than 64, the quantized level 2 (output value: 170) is output (in a step S8).

Figure 3:
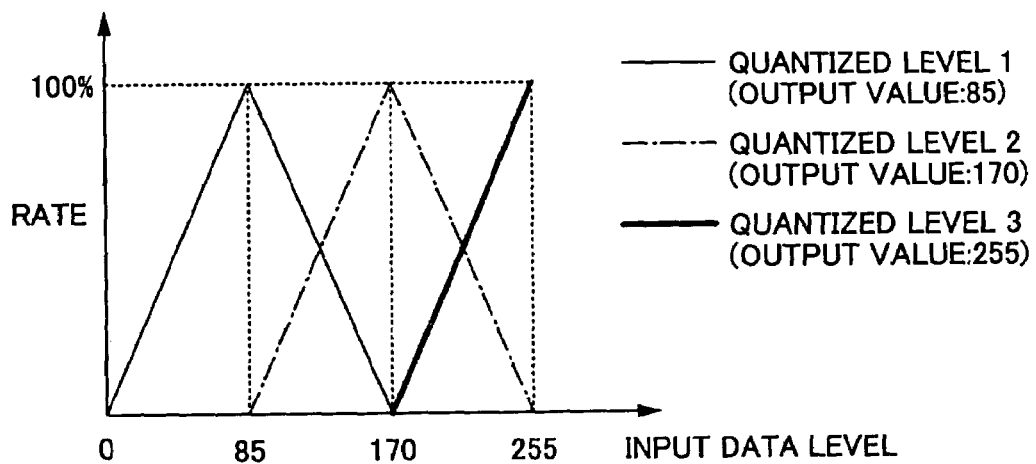
FIG. 3 shows a relationship between input image data levels and occurrence rates of quantized levels 1, 2 and 3, in a case of ordinary 4-level error diffusion process.

In a case where neither re-quantization nor output dot control described above is performed, and the quantized data of the quantization part 111 is output as it is, that is, the output dot control part 119 is removed, and an ordinary 4-level error diffusion process is performed, the rates (probabilities) of occurrence of the quantized levels 1, 2 and 3 change with respect to the level of the input image data 100 as shown in FIG. 3.

As shown in FIG. 3, when the input image data level increases from 0, the occurrence rate of the quantized level 1 increases, and, when the input image data level becomes 85, the occurrence rate of the quantized level 1 becomes 100%. When the input image data level exceeds 85, the occurrence rate of the quantized level 1 decreases, and the occurrence rate of the quantized level 2 increases. When the input image data level becomes 170, the occurrence rate of the quantized level 1 becomes 0%, and the occurrence rate of the quantized level 2 becomes 100%. When the input image data level exceeds 170, the occurrence rate of the quantized level 2 decreases, and the occurrence rate of the quantized level 3 increases. When the input image data level becomes 255, the occurrence rate of the quantized level 2 becomes 0%, and the occurrence rate of the quantized level 3 becomes 100%.

When the quantized data having this characteristic is provided to an image forming apparatus such as an electrophotographic printer, as shown in FIG. 3, for a medium level region (medium shade region) of the input image data 100, there is a region in which the rate of occurrence of unstable smallest dots of the quantized level 1 is high. In this region, stability and tonality of the image are degraded. Further, for a high level region (dark shade region) of the input image data 100, there is a region in which the rate of occurrence of small dots of the quantized level 2 is high. In this region, stability and tonality of the image are degraded.

Figure 4:
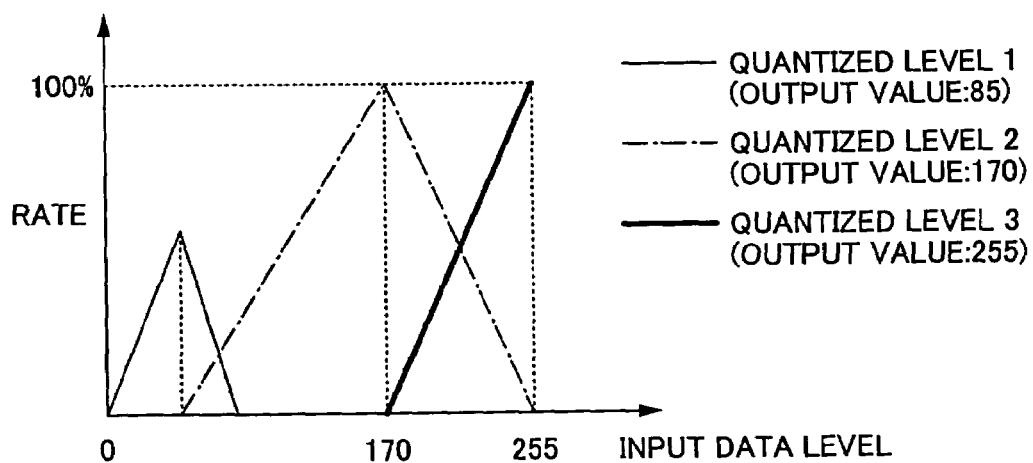
FIG. 4 shows one example of a relationship between input image data levels and occurrence rates of quantized levels 1, 2 and 3, in a case of 4-level error diffusion process according to the present invention.

On the other hand, in a case where re-quantization or output dot control described above is performed by the output dot control part 119 according to the present invention, the quantized levels 1, 2 and 3 occur at the rates with respect to the input image data level shown in FIG. 4.

As shown in FIG. 4, for a region (light shade region) in which the input image data level is low, the occurrence rate of the quantized level 1 increases as the input image data level increases. However, in a region (medium shade region) in which the input image data level is medium, from the level at which the occurrence rate of the quantized level 1 reaches 50% (determined by the above-mentioned constant), the occurrence rate of the quantized level 1 decreases sharply, and the occurrence rate of the quantized level 2 increases.

Accordingly, in a case where the output image data 101 is provided to an image forming apparatus such an electrophotographic printer, and images are formed in such a manner that dots are used larger for pixels having higher quantized levels, for a light shade region, images are formed by the smallest dots corresponding to the quantized level 1, and, thereby, isolated dots are not easily remarkable, and graininess is satisfactory.

In a medium shade region in which the small dots of the quantized level 2 occur, occurrence of the unstable smallest dots is repressed, and images are formed approximately only by the small dots of the quantized level 2. Accordingly, stability and graininess of the images are improved. Repressing of occurrence of the smallest dots is controlled according to the number of dots within the specific region in the periphery of a target pixel, and, also, an output dot for the pixel for which occurrence of the smallest dot is repressed is determined by re-quantization. Accordingly, through all the medium shade region, tonality is represented by an appropriate dot occupation rate, and the number of tones can be increased. Further, the mixing rate of dots is smoothly switched according to tonality change, and thereby, it is possible to form images in which switched portions smoothly couple.

Further, although not shown in figures, in another embodiment of the present invention, as a result of re-quantization or output dot control similar to those of the first embodiment being performed not for the quantized level 1 but for the quantized level 2, occurrence of the small dots of the quantized level 2 is repressed for a dark shade region in which large dots of the quantized level 3 occur. Thereby, as will be described in detail for a third embodiment described later, stability and graininess of the images in dark shade regions are improved.

Second Embodiment

Figure 5:
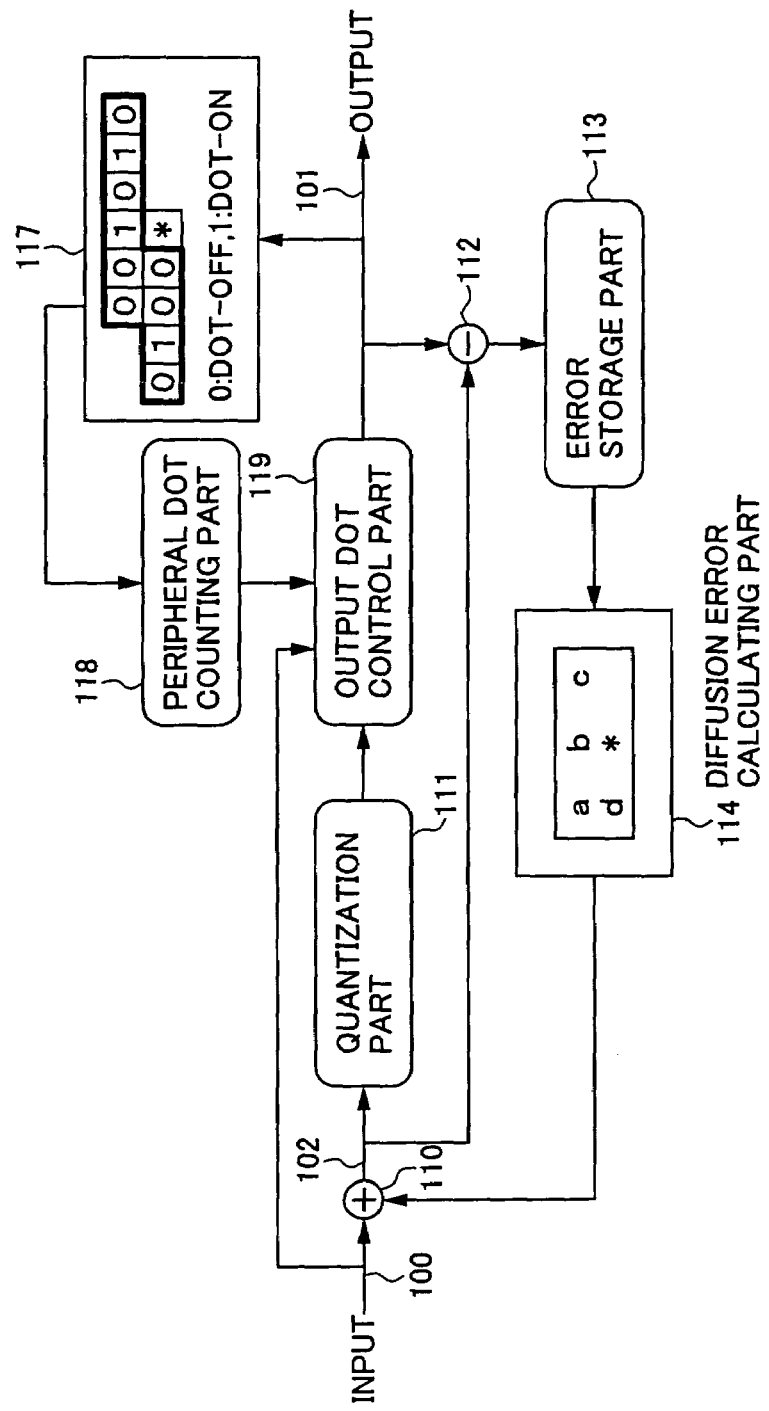
FIG. 5 is a block diagram showing another example of a block configuration of an image processing apparatus according to the present invention.

An image processing apparatus in a second embodiment of the present invention has a block configuration similar to that of the first embodiment described above. However, as shown in FIG. 5, also the input image data 100 is input to the output dot control part 119. Further, the output dot control part 119 executes the process shown in FIG. 6.

Figure 6:
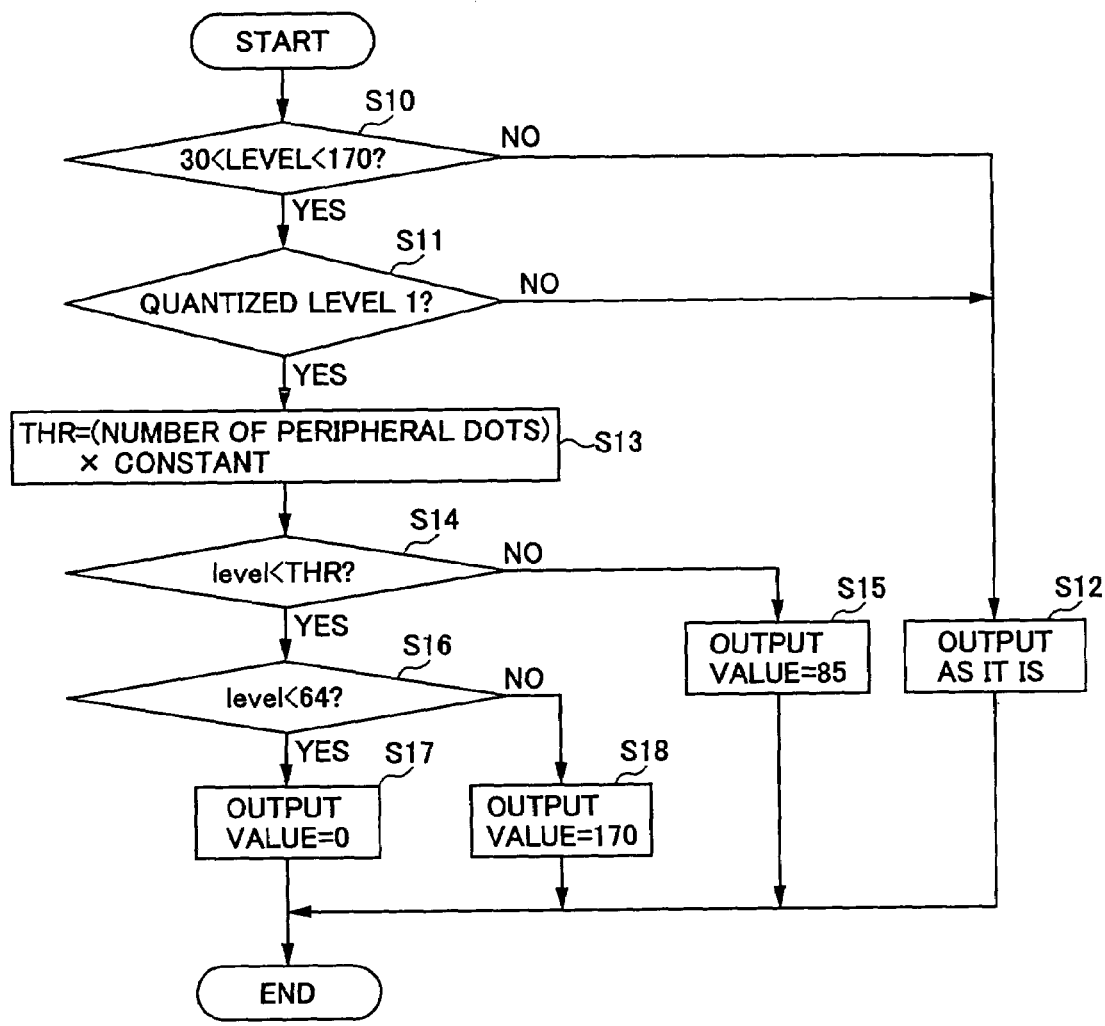
FIGS. 6 and 7 are flow charts showing other examples of processing performed by an output dot control part of the image processing apparatus according to the present invention.

This process will now be described with reference to FIG. 6.

First, the output dot control part 119 determines in a step S10 whether or not the level ('LEVEL', the level of the input image data 100) of a target pixel before having the error added thereto is within a range of a medium shade of 30 through 170. When the target pixel level 'LEVEL' is not larger than 30 or not smaller than 170, the quantization output of the quantization part 111 is output as it is (in a step S12).

However, when the target pixel level 'LEVEL' is within the range of 30 through 170, it is determined in a step S11 whether or not the quantization output of the quantization part 111 is the quantized level 1. When it is not the quantized level 1, the quantization output of the quantization part 111 is output as it is (in a step S12). However, when the quantization output is the quantized level 1, a process for re-quantization of the quantized level 1 the same as that of the above-described first embodiment is executed (in steps S13 through S18). The steps S13, S14, S15, S16, S17 and S18 are the same as the steps S3, S4, S5, S6, S7 and S8 shown in FIG. 2.

Thus, in the second embodiment, because the process of re-quantization of the quantized level 1 the same as that of the first embodiment is executed, the occurrence rates of the respective quantized levels with respect to the input image data level are controlled as shown in FIG. 4. However, the re-quantization of the quantized level 1 is not performed when the input image data level goes out of the range of 30 through 170. Accordingly, occurrence of the quantized level 1 is repressed in a region in which the input image data level exceeds 30.

Accordingly, an image forming method according to the present invention can be put into practice when the output image data 101 of the image processing apparatus in the second embodiment is provided to an electrophotographic printer or the like, and, thereby, similarly to the above-described first embodiment, it is possible to form images in which graininess is satisfactory in light shade regions, and stability, graininess and tonality are satisfactory in medium shade regions.

Further, in the second embodiment, output of the smallest dots of the quantized level 1 is repressed only when the input data level (shade level) is within the range of 30 through 170. Accordingly, line cutting-out or line vanishment of characters (or letters) in low-contrast character regions do not easily occur. Because such medium shade levels occur less frequently in high-contrast images (images such that black characters are present in white background) such as those of business documents, it is advantageous to eliminate such image data from objects of re-quantization at the first step in the output dot control part 119 for saving the process time. This point is especially advantageous in a case where the process is achieved by software.

Third Embodiment

Figure 7:
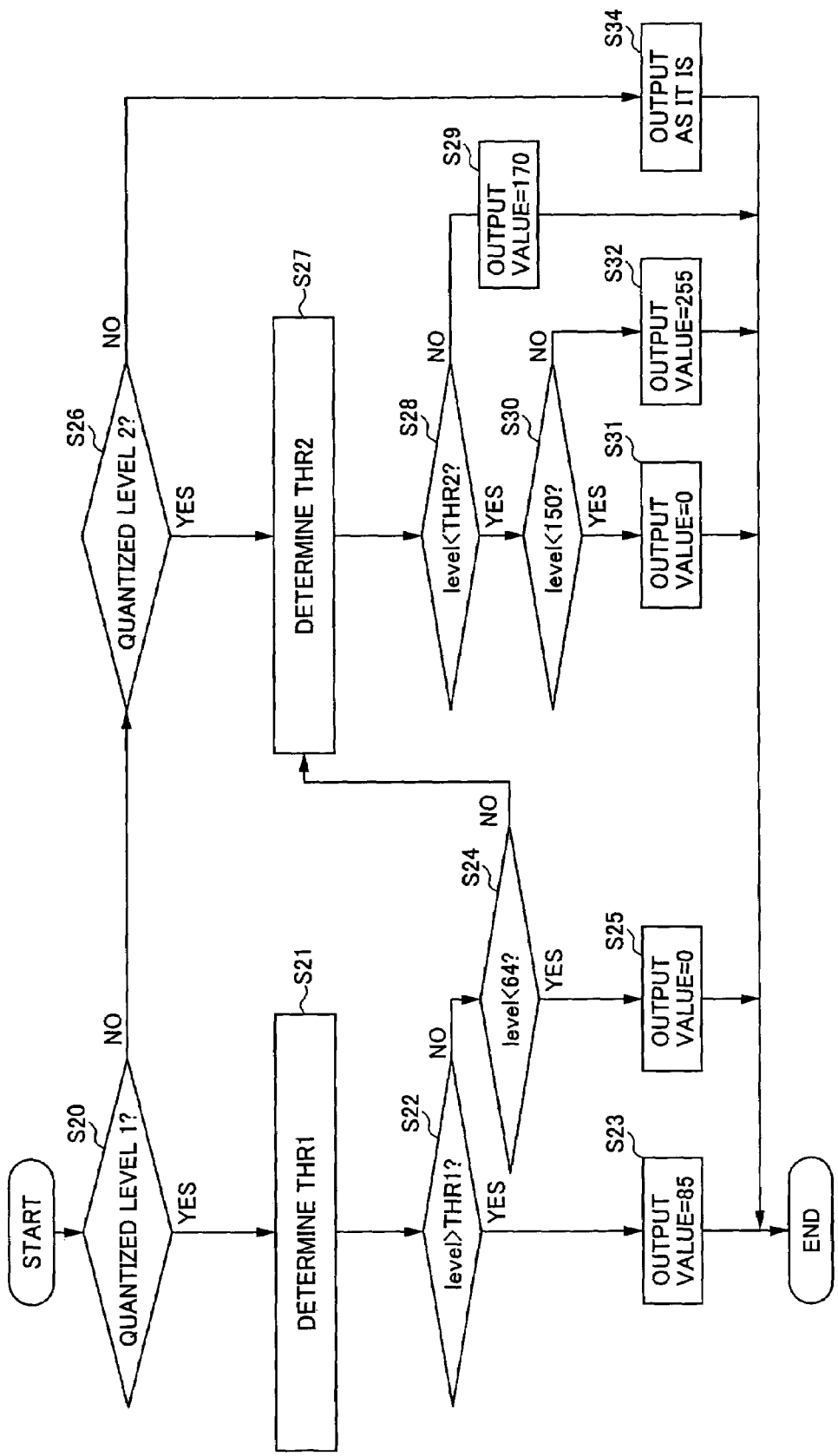

An image processing apparatus in a third embodiment of the present invention has a block configuration the same as that of the second embodiment shown in FIG. 5, but, executes by the output dot control part 119 the process of re-quantization for the quantized level 1 and quantized level 2 as shown in FIG. 7.

This process will now be described with reference to FIG. 7.

First, the output dot control part 119 determines in a step S20 whether or not the quantization output of the quantization part 111 for a target pixel is the quantized level 1 (output value: 85). When it is not the quantized level 1, it is determined in a step S26 whether or not the quantization output of the quantization part 111 is the quantized level 2. When the quantization output is neither the quantized level 1 nor the quantized level 2, the quantization output of the quantization part 111 is output as it is (in a step S34). Accordingly, the quantized level 0 and quantized level 3 are out of objects of re-quantization or output dot control.

When the quantization output of the quantization part 111 is the quantized level 1 (YES of the step S20), a threshold THR1 relating to the quantized level 1 is determined (in a step S21).

In the third embodiment, the threshold THR1 is calculated by the following equation:

$$THR1 = 43 + (LEVEL - A) \times count \times CNT1$$

As mentioned above, 'LEVEL' denotes the target pixel level of the input image data 100, 'count' denotes the number of peripheral dots counted by the peripheral dot counting part 118, 'A' and 'CNT1' are parameters for determining the input image data level at which the occurrence rate of the quantized level 1 starts decreasing and a slope of the decrease (see FIG. 8), and 'CNT1' is determined as 2, for example. Further, '43' corresponds to the quantization threshold T1.

Then, it is determined in a step S22 whether or not the target pixel level 'level' (level of the image data 102) after having the error added thereto is larger than the threshold THR1. When it is larger than the threshold THR1, it is determined that re-quantization for the quantized level 1 for the target pixel is not necessary, and the quantized level 1 (output value: 85) is output as it is (in a step S23). When the target pixel level exceeds A, the threshold THR1 increases as this level increases or as the number of pixels of ON dots in the periphery of the target pixel increases. Thereby, it comes to be easily determined that re-quantization of the quantized level 1 is necessary, and, thereby, the quantized level 1 comes to be not easily output.

When the target pixel level 'level' after having the error added thereto is not larger than the threshold THR1, it is determined that re-quantization is necessary, and this level 'level' is compared with a threshold relating to the quantized level 1, and is re-quantized. In the third embodiment, it is determined in a step S24 whether or not the target pixel level 'level' is smaller than 64 which is an approximately intermediate value between the quantization threshold T1 and the output value 85 of the quantized level 1. Then, when the target pixel level 'level' is smaller than 64, the quantized level 0 (output value: 0) is output (in a step S25). However, when it is not smaller than 64, a step S27 is executed, and re-quantization the same as that for the quantized level 2 is performed. (This is in order to prevent texture due to re-quantization from being generated.)

When the quantization output of the quantization part 111 is the quantized level 2 (YES in the step S26) or when the determination result of the step S24 is NO, a threshold THR2 relating to the quantized level 2 is determined (in a step S27). In the third embodiment, the threshold THR2 is calculated by the following equation:

$$THR2 = 128 + (LEVEL - B) \times count \times CNT2$$

As mentioned above, 'LEVEL' denotes the target pixel level of the input image data 100, 'count' denotes the number of peripheral dots counted by the peripheral dot counting part 118, 'B' and 'CNT1' are parameters for determining the input image data level at which the occurrence rate of the quantized level 2 starts decreasing and a slope of the decrease (see FIG. 8), and 'CNT2' is determined as 2, for example. Further, '128' corresponds to the quantization threshold T2.

Then, it is determined in a step S28 whether or not the target pixel level 'level' is smaller than the threshold THR2. When it is not smaller than the threshold level THR2, it is determined that re-quantization is not necessary, and the quantized level 2 (output value: 170) is output as it is (in a step S29). However, when the step S27 is executed after the step S24 is executed, it can be said that the quantized level 1 provided by the quantization part 111 is re-quantized to the quantized level 2. When the target pixel level 'LEVEL' exceeds B, the threshold THR2 increases as this level increases or as the number of pixels of ON dots in the periphery of the target pixel increases. Thereby, it comes to be easily determined that re-quantization of the quantized level 2 is necessary, and, thereby, the quantized level 2 comes to be not easily output.

When the target pixel level 'level' is smaller than the threshold THR2, this level 'level' is compared with a threshold relating to the quantized level 2, and, thus, is re-quantized. In the third embodiment, it is determined in a step S30 whether or not the target pixel level 'level' is smaller than 150 which is an approximately intermediate value between the quantization threshold T2 and the output value 170 of the quantized level 2. Then, when the target pixel level 'level' is smaller than 150, the quantized level 0 (output value: 0) is output (in a step S31). However, when the target pixel level 'level' is not smaller than 150, the quantized level 3 (output value: 255) is output (in a step S32).

Figure 8:
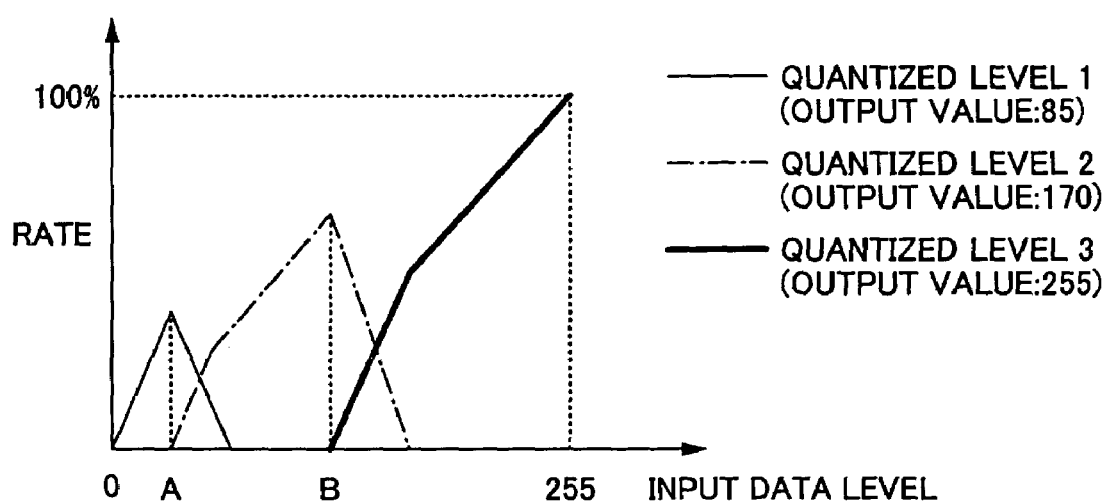
FIG. 8 shows another example of a relationship between input image data levels and occurrence rates of quantized levels 1, 2 and 3, in a case of 4-level error diffusion process according to the present invention.

In the third embodiment, re-quantization or output dot control is performed by the output dot control part 111 as describe above. Accordingly, the quantized levels 1, 2 and 3 occur at rates as shown in FIG. 8 with respect to the input image data level. As shown in FIG. 8, as the input image data level increases, the occurrence rate of the quantized level 1 increases. However, when it exceeds the level A, the occurrence rate of the quantized level 1 decreases sharply, and the occurrence rate of the quantized level 2 increases. Further, from the level B, the occurrence rate of the quantized level 2 decreases sharply, and the occurrence rate of the quantized level 3 increases. Further, each of the occurrence rates of the quantized levels 1 and 2 does not reach 100% (the maximum occurrence rates thereof are determined by the values of A and B used for calculating the thresholds THR1 and THR2).

When the output data 101 for which the occurrence rates of the quantized levels 1 and 2 are controlled is provided to an electrophotographic printer or the like, it is possible to form high-quality images. That is, for light shade regions, graininess is satisfactory because images are formed by the smallest dots of the quantized level 1. For medium shade regions in which the small dots of the quantized level 2 occur, occurrence of the unstable smallest dots is repressed, and images are formed approximately only by the small dots of the quantized level 2. Accordingly, stability and graininess of the images are improved. For dark shade regions in which the large dots of the quantized level 3 occur, occurrence of the small dots is repressed, and images are formed approximately only by the large dots. Accordingly, stability of the images is improved, and, saturation of tonality do not easily occur because the number of dots decreases.

Further, not only the number of dots within the specific region in the periphery of a target pixel but also the shade level of the target pixel are referred to for controlling repressing of the smallest dots and small dots. Also, the output dot for the thus-repressed pixel is determined by re-quantization. Accordingly, through all the medium and dark shade regions, tonality is represented by an appropriate dot occupation rate, and the number of tones can be increased. Further, the mixing rate of dots is smoothly switched according to tonality change, and thereby, it is possible to form images in which switched portions smoothly couple. This will now be further described with reference to FIG. 15.

Figure 15:
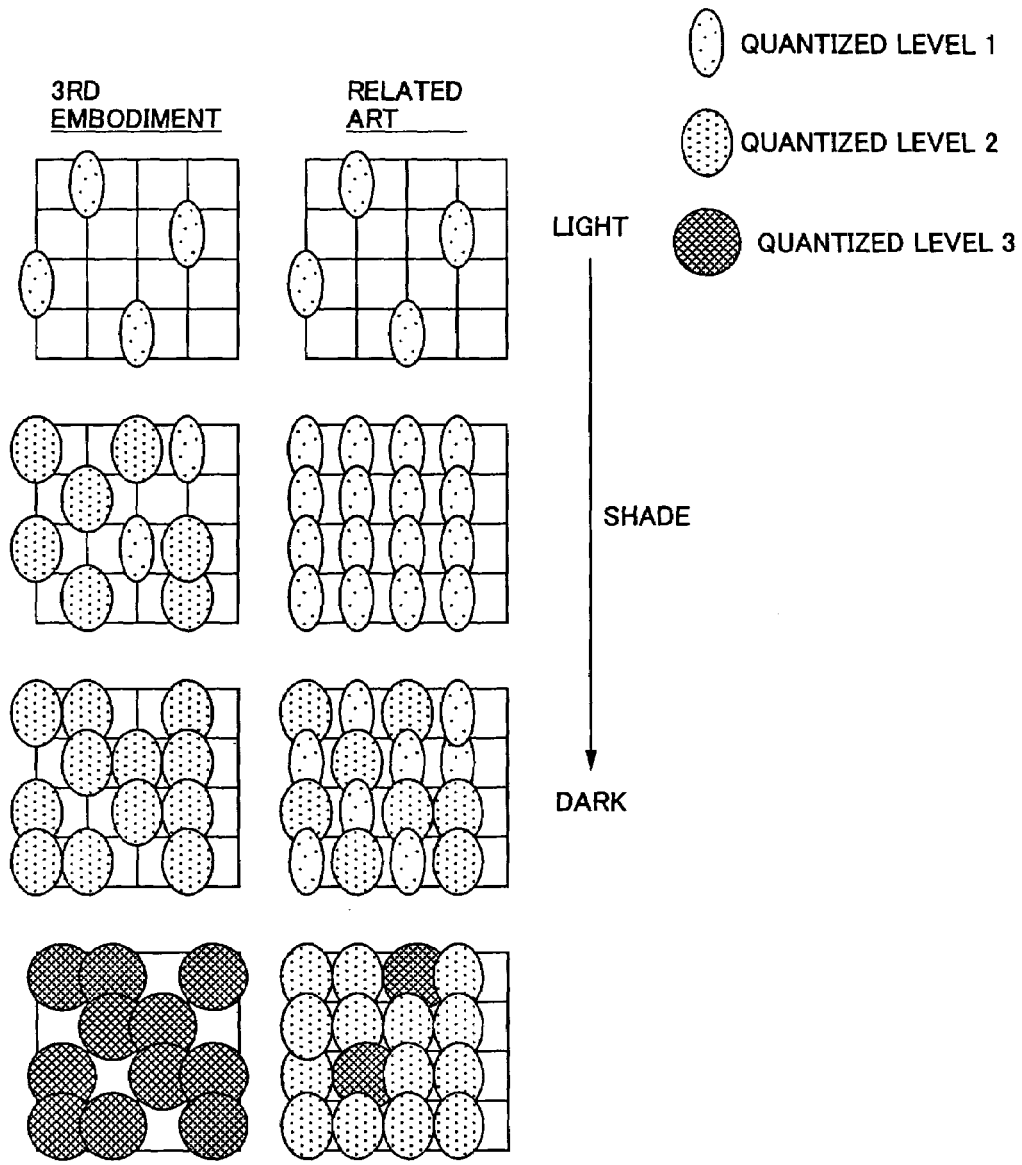
FIG. 15 shows dot occurrence states obtained from ordinary 4-level error diffusion process and dot occurrence states obtained from 4-level error diffusion process according to the present invention.

The left column of four images shown in FIG. 15 typically show states of dot occurrence in a light shade region through a dark shade region in a case where the output image data 101 of the image processing apparatus in the third embodiment is provided to an electrophotographic printer or the like. The right column of four images shown in FIG. 15 typically show states of dot occurrence in a light shade region through a dark shade region in a case where ordinary 4-level error diffusion processed data without employing repressing of the smartest dots and small dots is provided to an electrophotographic printer or the like.

As shown in the top row of two images of FIG. 15, images are formed by the smallest dots of the quantized level 1 for light shade regions. Accordingly, isolated dots are not easily remarkable, and, thereby, graininess is satisfactory.

As shown in images on the left column and second and third rows from the top of FIG. 15, in the third embodiment, for medium shade regions, occurrence of the unstable smallest dots of the quantized level 1 is repressed, and images are formed approximately only by the small dots of the quantized level 2. Accordingly, in comparison to the ordinary 4-level error diffusion processed case (the same rows on the right column in the figure), stability and graininess of the images are satisfactory.

As shown in the bottom-left image of FIG. 15, also for dark shade regions, in the third embodiment, occurrence of the small dots of the quantized level 2 is repressed, and images are formed only by the most stable large dots of the quantized level 3. Accordingly, in comparison to the ordinary 4-level error diffusion processed case (bottom-right image of the figure) in which the small dots of the quantized level 2 are present at high rate together with the large dots, stability of the images is satisfactory.

Further, in the ordinary 4-level error diffusion processed case, the number of dots output is large for dark shade regions. Accordingly, shade is easily saturated due to influence of dot gain (spread of dot), and ruin of tonality easily occurs. In contrast to this, in the third embodiment, only the large dots of the quantized level 3 are output for dark shade regions, and the number of dots output is small and white pixels which do not output dots also exist. Accordingly, ruin of tonality is eased in comparison to the ordinary 4-level error diffusion processed case.

Further, the mixing rate of dots having different sizes is switched smoothly with respect to change in tonality, thereby, tonality skipping and incongruity do not occur, and false contours which are problematic in the ordinary multi-level error diffusion processed case are not easily generated.

Further, for light shade regions of the input image data levels smaller than A, output of the smallest dots is not repressed. Accordingly, line cut-out and line vanishment of characters (or letters) in low-contrast character portions do not easily occur.

Further, in the third embodiment, it is possible to control the input image data levels (A and B) at which repressing of occurrence of the quantized levels 1 and 2 starts individually by the parameters A and B. Further, in the third embodiment, when the parameter B is set to 255, it is possible to repress only the quantized level 1 and to control the occurrence rates of the respective quantized levels same as in the first embodiment. These two points are also same in fourth, sixth and seventh embodiments which will be described later.

Fourth Embodiment

An image processing apparatus in a fourth embodiment of the present invention has a block configuration shown in FIG. 5, but information stored in the peripheral dot information storage part 117, operation of the peripheral dot counting part 118 and processing performed by the output dot control part 119 are different from those of each embodiment described above.

The peripheral dot information storage part 117 stores dot information of pixels having undergone quantization, on total two lines, i.e., the line including a target pixel and the immediately proceeding line, similarly to the case of each embodiment described above. However, in the fourth embodiment, not ON/OFF of dots but information indicating the quantized levels of the respective pixels are stored in the peripheral dot information storage part 117.

The peripheral dot counting part 118 refers to the information stored in the peripheral dot information storage part 117, and, counts each of the number of pixels of the quantized level 1, the number of pixels of the quantized level 2 and the number of pixels of the quantized level 3 of the ten (10) pixels having undergone quantization in the periphery of a target pixel.

Thus, in each embodiment described above, the peripheral ON dots are counted without distinguishing the quantized levels thereof, but in the fourth embodiment, the pixels of ON dots are counted for each quantized level separately.

Figure 9:
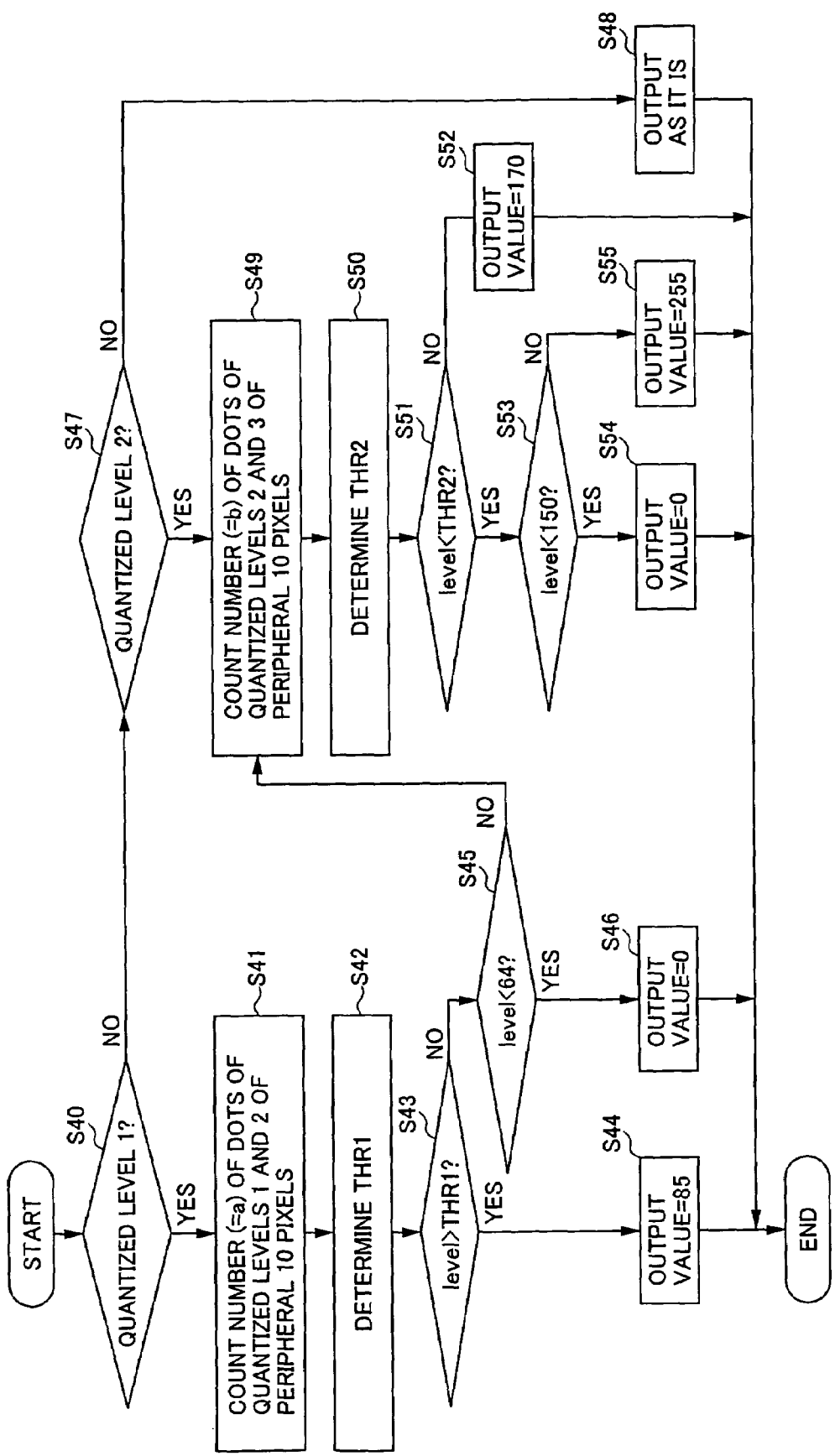
FIG. 9 is a flow chart showing another example of processing performed by the output dot control part of the image processing apparatus according to the present invention.

In the fourth embodiment, re-quantization process or output dot control process, shown in FIG. 9, is performed by the output dot control part 119 on a target pixel having been quantized into the quantized level 1 or 2 by the quantization part 111.

First, the output dot control part 119 determines in a step S40 whether or not the quantization output of the quantization part 111 for a target pixel is the quantized level 1 (output value: 85). When it is not the quantized level 1, it is determined in a step S47 whether or not the quantization output is the quantized level 2. When the quantization output is neither the quantized level 1 nor the quantized level 2, the quantization output of the quantization part 111 is output as it is (in a step S48).

When the quantization output of the quantization part 111 is the quantized level 1 (YES of the step S40), the number 'a' of dots which is the sum of the numbers of pixels of the quantized levels 1 and 2 provided by the peripheral dot counting part 118 is calculated (in a step S41). Then, this number 'a' of dots is used, and a threshold THR1 relating to the quantized level 1 is determined (in a step S42). In the fourth embodiment, the threshold THR1 is calculated by the following equation:

$$THR1=43+(LEVEL-A) \times a \times CNT1$$

Thus, although the number 'count' of dots (see the step S21 of FIG. 7) which is the sum of the numbers of pixels of the quantized levels 1, 2 and 3 is used in the third embodiment, the number 'a' of dots obtained from subtracting the number of pixels of the quantized level 3 from this 'count' is used for calculating the threshold THR1 in the fourth embodiment.

Then, it is determined in a step S43 whether or not the target pixel level 'level' is larger than the threshold THR1. When it is larger than the threshold THR1, it is determined that re-quantization for the quantized level 1 for the target pixel is not necessary, and the quantized level 1 (output value: 85) is output as it is (in a step S44). When the target pixel level 'LEVEL' exceeds A, the threshold THR1 increases as this level increases or as the number of pixels of the quantized levels 1 and 2 in the periphery of the target pixel increases. Thereby, it comes to be easily determined that re-quantization of the quantized level 1 is necessary, and, thereby, the quantized level 1 comes to be not easily output.

When the target pixel level 'level' is not larger than the threshold THR1, it is determined that re-quantization is necessary, and this level 'level' is compared with a threshold relating to the quantized level 1, and is re-quantized. In the fourth embodiment, it is determined in a step S45 whether or not the target pixel level 'level' is smaller than 64 which is an approximately intermediate value between the quantization threshold T1 and the output value 85 of the quantized level 1. Then, when the target pixel level 'level' is smaller than 64, the quantized level 0 (output value: 0) is output (in a step S46). However, when the target pixel level 'level' is not smaller than 64, a step S49 is executed, and re-quantization the same as that for the quantized level 2 is performed. (This is in order to prevent texture due to re-quantization from being generated.)

When the quantization output of the quantization part 111 is the quantized level 2 (YES in the step S47) or when the determination result of the step S45 is NO, the number 'b' of dots which is the sum of the numbers of pixels of the quantized levels 2 and 3 provided by the peripheral dot counting part 118 is calculated (in a step S49). Then, using this number 'b' of dots, a threshold THR2 relating to the quantized level 2 is determined (in a step S50). In the fourth embodiment, the threshold THR2 is calculated by the following equation:

$$THR2=128+(LEVEL-B) \times b \times CNT2$$

Thus, although the number 'count' of dots (see the step S27 of FIG. 7) which is the sum of the numbers of pixels of the quantized levels 1, 2 and 3 is used in the third embodiment, the number 'b' of dots obtained from subtracting the number of pixels of the quantized level 1 from this 'count' is used for calculating the threshold THR2 in the fourth embodiment.

Then, it is determined in a step S51 whether or not the target pixel level 'level' (level of the pixel data 102) is smaller than the threshold THR2. When it is not smaller than the threshold level THR2, it is determined that re-quantization is not necessary, and the quantized level 2 (output value: 170) is output as it is (in a step S52). However, when the step S49 is executed after the step S45 is executed, it can be said that the quantized level 1 provided by the quantization part 111 is re-quantized to the quantized level 2. When the target pixel level 'LEVEL' exceeds B, the threshold THR2 increases as this level increases or as the number of pixels of the quantized levels 2 and 3 in the periphery of the target pixel increases. Thereby, it comes to be easily determined that re-quantization of the quantized level 2 is necessary, and, thereby, the quantized level 2 comes to be not easily output.

When the target pixel level 'level' is smaller than the threshold THR2, this level 'level' is compared with a threshold relating to the quantized level 2, and, thus, is re-quantized. In the fourth embodiment, it is determined in a step S53 whether or not the target pixel level 'level' is smaller than 150 which is an approximately intermediate value between the quantization threshold T2 and the output value 170 of the quantized level 2. Then, when the target pixel level 'level' is smaller than 150, the quantized level 0 (output value: 0) is output (in a step S54). However, when the target pixel level 'level' is not smaller than 150, the quantized level 3 (output value: 255) is output (in a step S55).

In the fourth embodiment, through re-quantization for the quantized levels 1 and 2, the quantized levels 1, 2 and 3 occur at rates as shown in FIG. 8 same as in the above-described third embodiment. Accordingly, as described above for the third embodiment, in a case where the output image data 101 is provided to an image forming apparatus such an electrophotographic printer, and images are formed in such a manner that dots are used larger for pixels having higher quantized levels, graininess is satisfactory for light shade regions, stability of images and graininess are satisfactory for medium shade regions, and stability of images is satisfactory for dark shade regions. Further, ruin of tonality is eased. Further, the mixing rate of dots having different sizes is switched smoothly with respect to change in tonality, thereby, skipping of tonality and incongruity do not occur, and false contours which are problematic in the ordinary multi-level error diffusion processed case are not easily generated.

In particular, in the fourth embodiment, the number 'a' of dots obtained from subtracting the number of large dots from the number of peripheral dots is used for control of repressing occurrence of the smallest dots. Accordingly, the smallest dots are not repressed even when the many large dots exist in the periphery of a target pixel. As a result, jaggy in character (or letter) regions or edge regions of images can be eased, and it is possible to produce images having improved sharpness.

Thus, in the fgourth embodimdent, sharpness which is an advnatage of multi-level error diffusion is maintained, and, also, stability and tonality for medium and dark shade regions which may not easily be improved in multi-level error diffusion can be improved.

Fifth Embodiment

Figure 10:
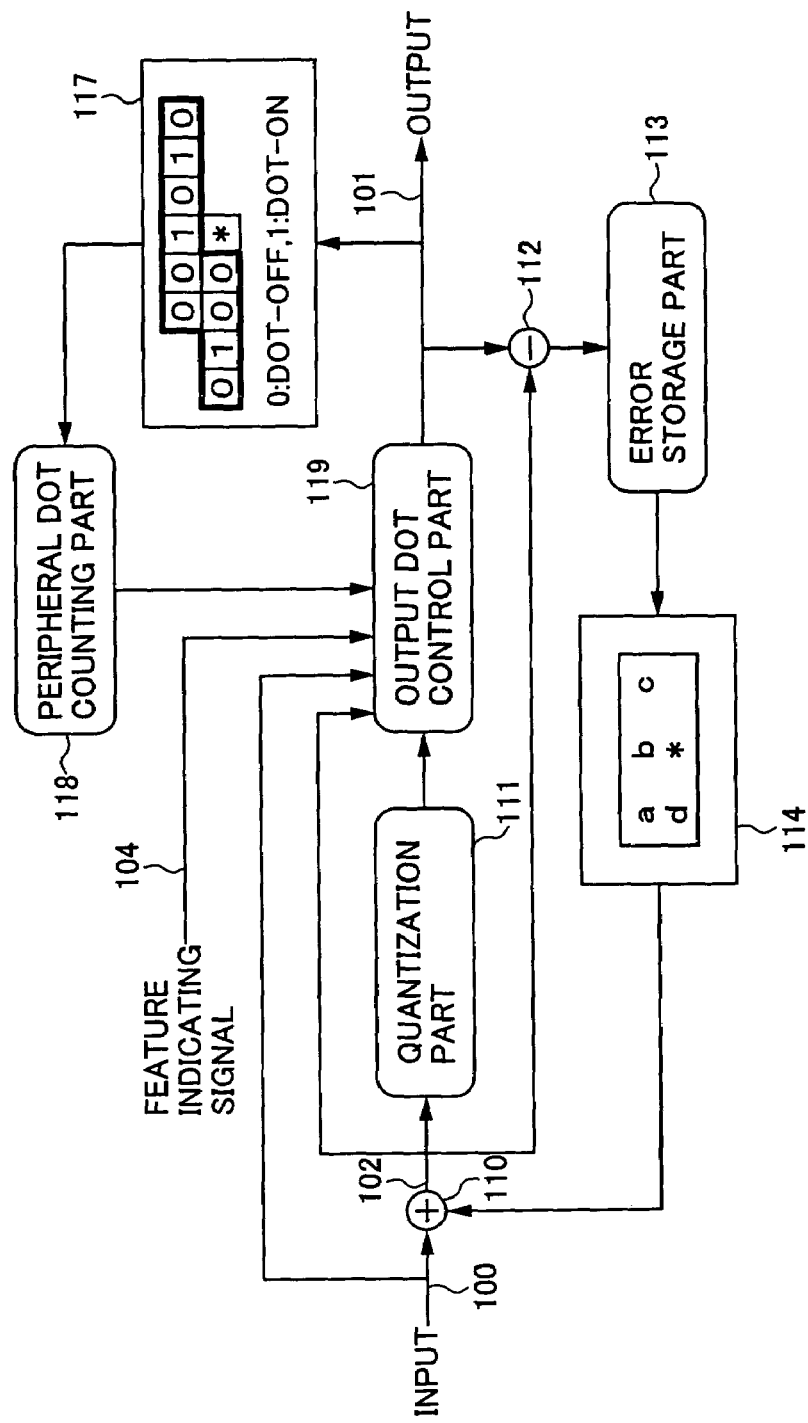
FIG. 10 is a block diagram showing another example of a block configuration of an image processing apparatus according to the present invention.

A block configuration of an image processing apparatus in a fifth embodiment of the present invention is, as shown in FIG. 10, different from that of the above-described second embodiment, in that a feature indicating signal 104 indicating a feature of an image region including a target pixel is input to the output dot control part 119 in the fifth embodiment.

In the fifth embodiment, through the feature indicating signal 104, it is indicated whether the image region including a target pixel is either a character (or letter) region or a picture region. A feature determining part which generates the feature indicating signal 104 will be described later. In the fifth embodiment, the feature determining part is provided outside of the apparatus. However, in another embodiment, the feature determining part is provided inside of the apparatus.

Figure 11:
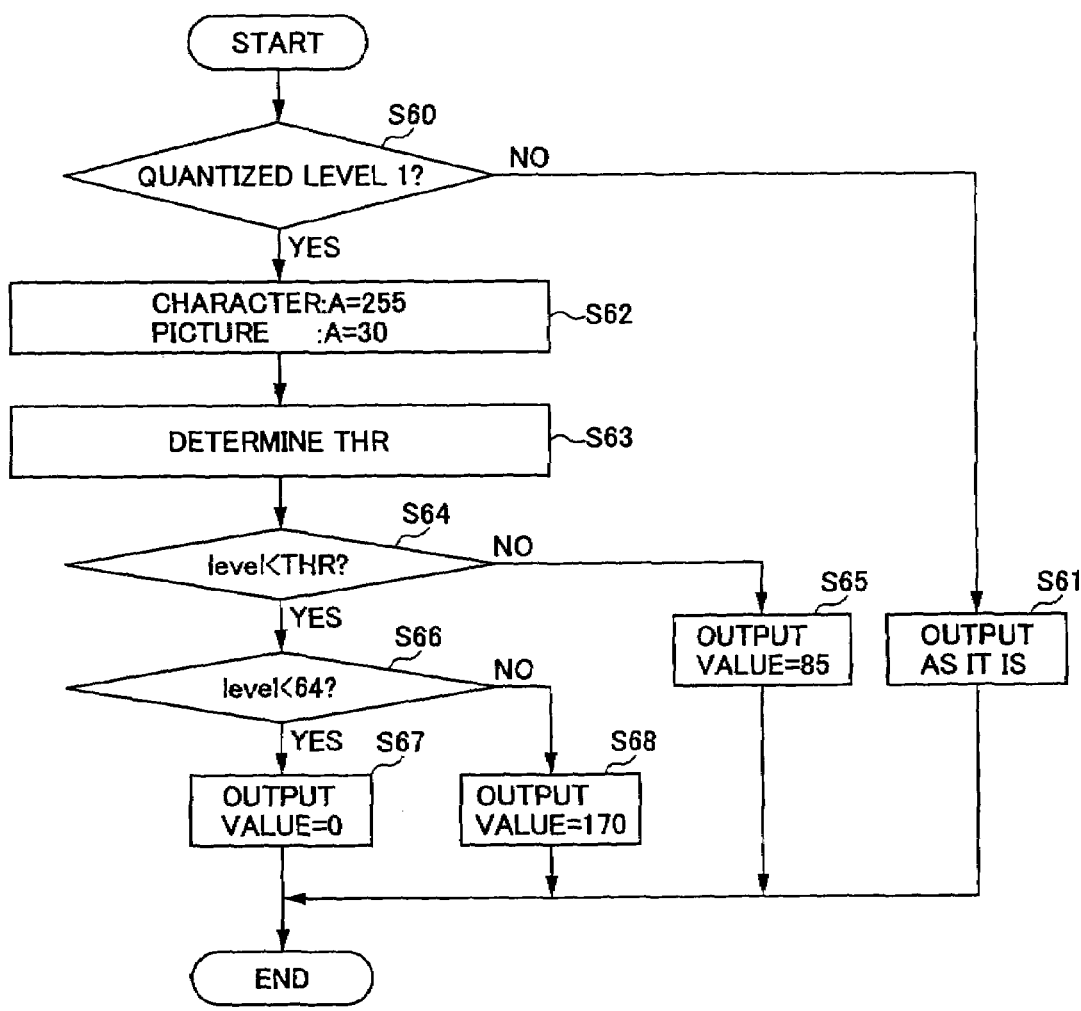
FIGS. 11 and 12 are flow charts showing other examples of processing performed by an output dot control part of the image processing apparatus according to the present invention.

Information stored in the peripheral dot information storage part 117, operation of the peripheral dot counting part 118 are same as those in the above-described second embodiment. The output dot control part 119 executes the re-quantization process for the quantized level 1 as shown in FIG. 11. This process will now be described with reference to FIG. 11.

First, the output dot control part 119 determines in a step S60 whether or not the quantization output of the quantization part 111 for a target pixel is the quantized level 1 (output value: 85). When it is not the quantized level 1, the quantization output of the quantization part 111 is output as it is (in a step S61).

When the quantization output of the quantization part 111 is the quantized level 1 (YES in the step S60), a parameter A for determining a threshold THR is set according to the state of the feature indicating signal 104 (in a step S62). In the fifth embodiment, setting is made such that A=255 when the feature indicating signal 104 indicates a character region, but setting is made such that A=30 when the feature indicating signal 104 indicates a picture region. Then, the threshold THR is calculated (in a step S63) by the following equation:

$$THR = 43 + (LEVEL - A) \times count \times CNT$$

There, as mentioned above, 'LEVEL' denotes the target pixel level of the input image data 100, 'count' denotes the number of peripheral dots counted by the peripheral dot counting part 118, and 'CNT' is 2, for example. '43' corresponds to the quantization threshold T1.

Then, it is determined in a step S64 whether or not the target pixel level 'level' after having the diffusion error added thereto is smaller than the threshold THR. When it is not smaller than the threshold THR, it is determined that re-quantization is not necessary, and the quantized level 1 (output value: 85) is output as it is (in a step S65). When the target pixel level 'level' is smaller than the threshold THR, the target pixel level 'level' is compared with a threshold relating to the quantized level 1, and thus, is re-quantized. In the fifth embodiment, it is determined in a step S66 whether or not the target pixel level 'level' is smaller than 64 which is an approximately intermediate value between the quantization threshold T1 and the output value 85 of the quantized level 1. When it is smaller than 64, the quantized level 0 (output value: 0) is output in a step S67. However, when the target pixel level 'level' is not smaller than 64, the quantized level 2 (output value: 170) is output in a step S68. When the target pixel level 'LEVEL' exceeds A, the threshold THR increases as this level increases or as the number of dots in the periphery of the target pixel increases, and the probability of the quantized level 1 being re-quantized increases. Accordingly, the quantized level 1 is not easily output.

In this process, when the target pixel is a pixel in a character region, setting is made such that A=255 as mentioned above. Accordingly, the determination result of the step S64 is always NO. That is, it is always determined that re-quantization is not necessary. As a result, the quantization output of the quantization part 111 is output as it is. Accordingly, occurrence of the quantized level 1 is not repressed. Thus, in this cased, the process executed is same as the process executed in the ordinary 4-level error diffusion process in which the output dot control part 119 is not provided. Accordingly, the respective quantized levels occur at rates as shown in FIG. 3. Thereby, for character regions of images, it is possible to form images having improved sharpness.

On the other hand, when the target pixel is a pixel in a picture region, setting is made such that A=30 as mentioned above. Accordingly, when the input image data level exceeds A, output of the quantized level 1 is repressed as this level increases or as the number of dots in the periphery of the target pixel becomes larger. As a result, occurrence rates of the respective quantized levels are those shown in FIG. 4. Accordingly, similarly to the case of the above-described first embodiment, for picture regions of images, graininess is satisfactory for light shade regions, and stability, graininess and tonality of images are improved for medium shade regions in comparison to the case of ordinary 4-level error diffusion process.

It is also possible to set the parameter A smaller than 255 for character regions, and, to repress occurrence of the quantized level 1 also for character regions but in a repressing degree weaker than that for picture regions. Generally speaking, it is preferable to perform control such that the degree of repressing occurrence of the quantized level 1 be weaker for character regions than that for picture regions.

In a variant embodiment of the fifth embodiment, a similar re-quantization process is executed only for the quantized level 2, and, occurrence of the quantized level 2 is repressed. In this case, stability, tonality and so forth of images are improved for dark shade regions.

In another variant embodiment of the fifth embodiment, through the feature indicating signal 104, it is indicated whether a picture region including a target pixel is an edge region or a non-edge region. A feature determining part which generates this feature indicating signal 104 will be described later. This feature determining part may be provided outside of the apparatus or may be provided inside of the apparatus. The output dot control part 119 changes a degree of repressing small dots according to whether a target pixel is included in an edge region or a non-edge region. For example, when the target pixel is in an edge region, the parameter A is set to 255, and output of the quantized level 1 is made not to be repressed. Thereby, it is possible to form an image having a satisfactory sharpness for edge regions. On the other hand, when the target pixel is included in a non-edge region, the parameter A is set to 30, and output of the quantized level 1 is strongly repressed. Accordingly, it is possible to form an image having satisfactory stability, graininess and tonality for non-edge regions.

Further, similarly in a case of a sixth embodiment which will be described later, it is also possible to re-classify picture regions into photograph regions and halftone-dot regions, and, to change the parameter A (parameters A and B in the sixth embodiment) for the respective regions. Furthermore, it is also possible to aim other feature(s) of images, and to change the parameter(s) similarly.

The above-mentioned feature determining part which generates the feature indicating signal 104 indicating distinction between a character region and a picture region will now be described.

In a character region of an image, black pixels and white pixies occur continuously along an edge portion of a character. In a halftone-dot region, peaks in shade occur intermittently and cyclically. In a photograph region, shade change is a little. By detecting such image features of character region, halftone-dot region and photograph region, it is possible to distinguish between character regions and picture regions (photograph regions and halftone-dot regions).

With regard to such feature determination (discrimination), many related arts are known. For example, as disclosed in Japanese Laid-Open Patent Application No. 3-276966, peaks in shade in an image are detected, and, a region in which cyclicity of the detected peaks is recognized is extracted as a halftone-dot region, a region having a little shade change is extracted as a photograph region, a region which is neither a halftone-dot region nor a photograph region is extracted as a line-drawn region, and 'character region' is indicated for a target pixel included in a line-drawn region but 'picture region' is indicated for a target pixel included in a halftone-dot region or a photograph region. The feature detecting part which executes the above-described process may be used in the relevant embodiment of the present invention. The feature determining part having another configuration may be used instead.

Then, the feature determining part which generates the feature indicating signal 104 indicating distinction between an edge region and a non-edge region will now be described. Also for such feature determination (discrimination), many related arts are known, and any thereof may be used. For example, four types of differential filters shown in FIGS. 19A, 19B, 19C and 19D are used, and edge amounts are detected for total four directions, i.e., a main scanning direction, a sub-scanning direction, and directions inclined from the main scanning direction by ±45°, a region in which the absolute value of the edge amount exceeds a predetermined threshold in any direction is determined as an edge region, and a region other than such a region is determined as a non-edge region. The feature determining part which executes the above-described process may be used.

A method of detecting the edge amount by using the differential filters shown in FIGS. 19A through 19D is to obtain the sum of the values obtained from multiplying image data of pixels surrounding a target pixel at pixel positions shown in each of the filters shown in FIGS. 19A through 19D by the corresponding coefficients shown in the figures, respectively, for example.

Sixth Embodiment

Figure 12:
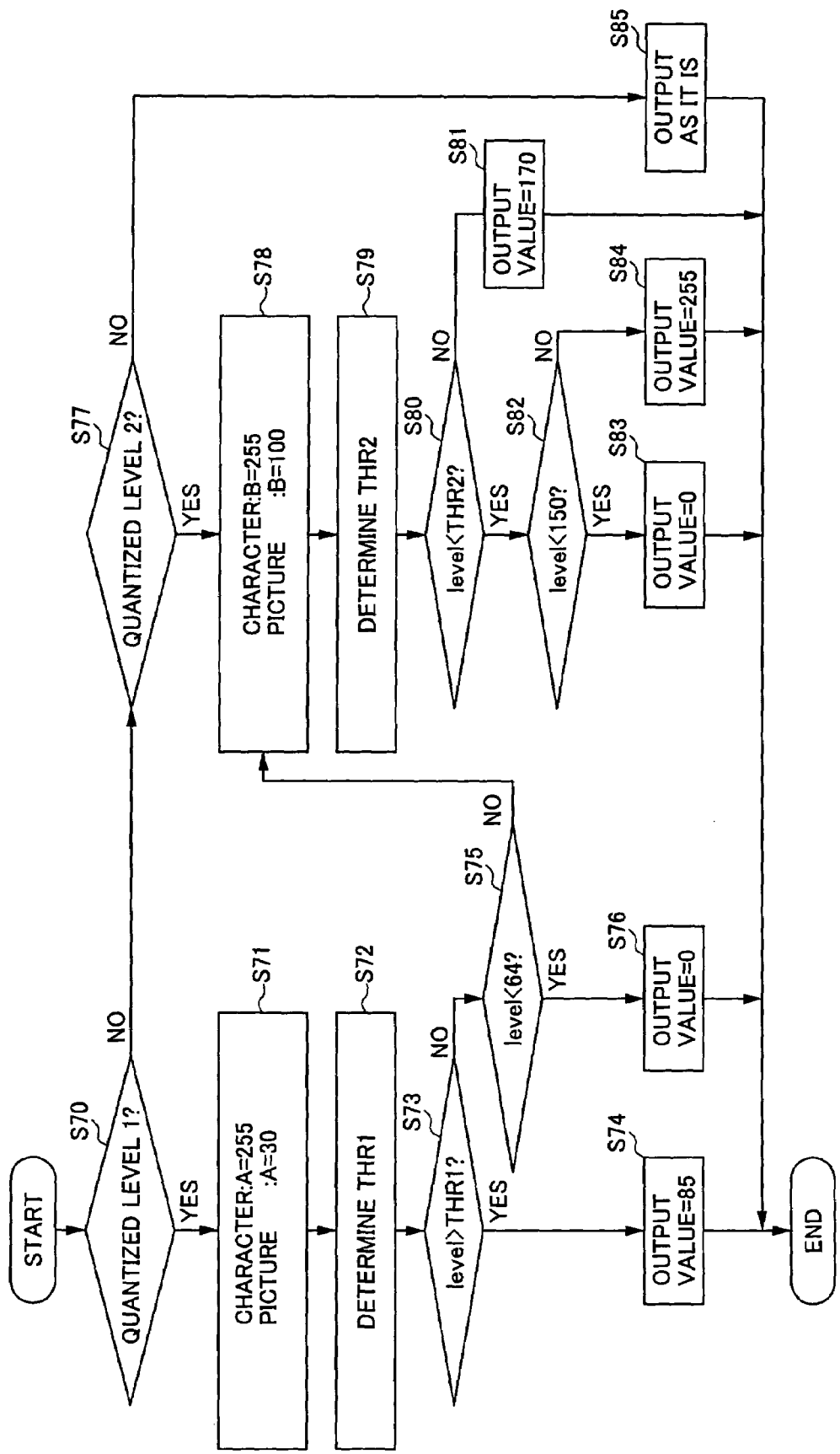

An image processing apparatus in a sixth embodiment according to the present invention has a block configuration shown in FIG. 10 the same as that of the above-described fifth embodiment. However, the processing performed by the output dot control part 119 is different from that of the fifth embodiment, as shown in FIG. 12.

The feature indicating signal 104 indicates, similar to the feature indicating signal 104 of the fifth embodiment, whether a image region including a target pixel is a character region or a picture region.

The process executed by the output dot control part 119 of the sixth embodiment will now be described with reference to FIG. 12.

First, the output dot control part 119 determines in a step S70 whether or not the quantization output of the quantization part 111 for a target pixel is the quantized level 1 (output value: 85). When it is not the quantized level 1, it is determined in a step S77 whether or not the quantization output of the quantization part 111 is the quantized level 2. When it is neither the quantized level 1 nor the quantized level 2, the quantization output of the quantization part 111 is output as it is (in a step S85). When the quantization output of the quantization part 111 is the quantized level 1 (YES of the step S70), a parameter A for determining a threshold THR1 relating to the quantized level 1 is set according to the state of the feature indicating signal 104 in a step S71. In the sixth embodiment, setting is made such that A=255 when the feature indicating signal 104 indicates "character region" but setting is made such that A=30 when the feature indicating signal 104 indicates "picture region". Then, the threshold THR1 is calculated in a step S72 by the following equation:

$$THR1 = 43 + (LEVEL - A) \times \text{count} \times CNT1$$

As mentioned above, 'LEVEL' denotes the target pixel level of the input image data 100, 'count' denotes the number of peripheral dots counted by the peripheral dot counting part 118, 'A' and 'CNT1' are parameters for determining the input image data level at which the occurrence rate of the quantized level 1 starts decreasing and a slope of the decrease (see FIG. 8), and CNT1 is determined as 2, for example. Further, '43' corresponds to the quantization threshold T1.

Then, it is determined in a step S73 whether or not the target pixel level 'level' (level of the image data 102) is larger than the threshold THR1. When it is larger than the threshold THR1, it is determined that re-quantization for the quantized level 1 for the target pixel is not necessary, and the quantization output of the quantization part 111, that is, the quantized level 1 (output value: 85) is output as it is (in a step S74).

When the target pixel level 'level' after having the error added thereto is not larger than the threshold THR1, it is determined that re-quantization is necessary, and this level 'level' is compared with a threshold relating to the quantized level 1, and is re-quantized. In the sixth embodiment, it is determined in a step S75 whether or not the target pixel level 'level' is smaller than 64 which is an approximately intermediate value between the quantization threshold T1 and the output value 85 of the quantized level 1. Then, when it is smaller than 64, the quantized level 0 (output value: 0) is output (in a step S76). However, when it is not smaller than 64, a step S78 is executed, and re-quantization the same as that for the quantized level 2 is performed. (This is in order to prevent texture due to re-quantization from being generated.) When the target pixel level exceeds A, the threshold THR1 increases as this level increases or as the number of pixels of dots in the periphery of the target pixel increases. Thereby, the quantized level 1 comes to be not easily output.

When the quantization output of the quantization part 111 is the quantized level 2 (YES in the step S77) or when the determination result of the step S75 is NO, a parameter B for determining a threshold THR2 relating to the quantized level 2 is determined according to the state of the feature indicating signal 104 in a step S78. In the sixth embodiment, setting is made such that B=255 when the feature indicating signal 104 indicates "character region" but setting is made such that B=100 when the feature indicating signal 104 indicates "picture region". Then, the threshold THR2 relating to the quantized level 2 is calculated (in a step S79) by the following equation:

$$THR2 = 128 + (LEVEL - B) \times count \times CNT2$$

As mentioned above, 'LEVEL' denotes the target pixel level of the input image data 100, 'count' denotes the number of peripheral dots counted by the peripheral dot counting part 118, 'B' and 'CNT2' are parameters for determining the input image data level at which the occurrence rate of the quantized level 2 starts decreasing and a slope of the decrease (see FIG. 8), and CNT2 is determined as 2, for example. Further, '128' corresponds to the quantization threshold T2.

Then, it is determined in a step S80 whether or not the target pixel level 'level' is smaller than the threshold THR2. When it is not smaller than the threshold level THR2, it is determined that re-quantization is not necessary, and the quantized level 2 (output value: 170) is output as it is (in a step S81). However, when the step S78 is executed after the step S75 is executed, it can be said that the quantized level 1 is re-quantized to the quantized level 2.

When the target pixel level 'level' is smaller than the threshold THR2, this level 'level' is compared with a threshold relating to the quantized level 2, and, thus, is re-quantized. In the sixth embodiment, it is determined in a step S82 whether or not the target pixel level 'level' is smaller than 150 which is an approximately intermediate value between the quantization threshold T2 and the output value 170 of the quantized level 2. Then, when the target pixel level 'level' is smaller than 150, the quantized level 0 (output value: 0) is output (in a step S83). However, when the target pixel level 'level' is not smaller than 150, the quantized level 3 (output value: 255) is output (in a step S84). When the target pixel level exceeds B, the threshold THR2 increases as this level increases or as the number of pixels of dots in the periphery of the target pixel increases. Thereby, the quantized level 2 comes to be not easily output.

In this process, when the target pixel is a pixel in a character region, setting is made such that A=B=255, as mentioned above. Accordingly, the determination results in the steps S73 and S80 are always NO, and output of the quantized levels 1 and 2 is not repressed. That is, it is always determined that re-quantization is not necessary. As a result, the quantization output of the quantization part 111 is output as it is. Accordingly, occurrence of the quantized levels 1 and 2 is not repressed. Thus, in this case, the process executed is same as the process executed in the ordinary 4-level error diffusion process in which the output dot control part 119 is not provided. Accordingly, the respective quantized levels occur at rates as shown in FIG. 3. Thereby, for character regions of images, it is possible to form images having improved sharpness.

On the other hand, when the target pixel is a pixel in a picture region, setting is made such that A=30 and B=100, as mentioned above. Accordingly, when the input image data level exceeds A, output of the quantized level 1 is repressed. Further, when the input image data level exceeds B, output of the quantized level 2 is repressed. As a result, occurrence rates of the respective quantized levels are those shown in FIG. 8. Accordingly, similarly to the case of the above-described third embodiment and so forth, for picture regions of images, graininess is satisfactory for light shade regions, and stability, graininess and tonality of images are improved for medium and dark shade regions.

Similarly to the above-described fifth embodiment, it is also possible to set the parameters A and B smaller than 255 for character regions, and, to repress occurrence of the quantized levels 1 and 2 also for character regions but in repressing degrees weaker than those for picture regions.

Seventh Embodiment

Figure 13:
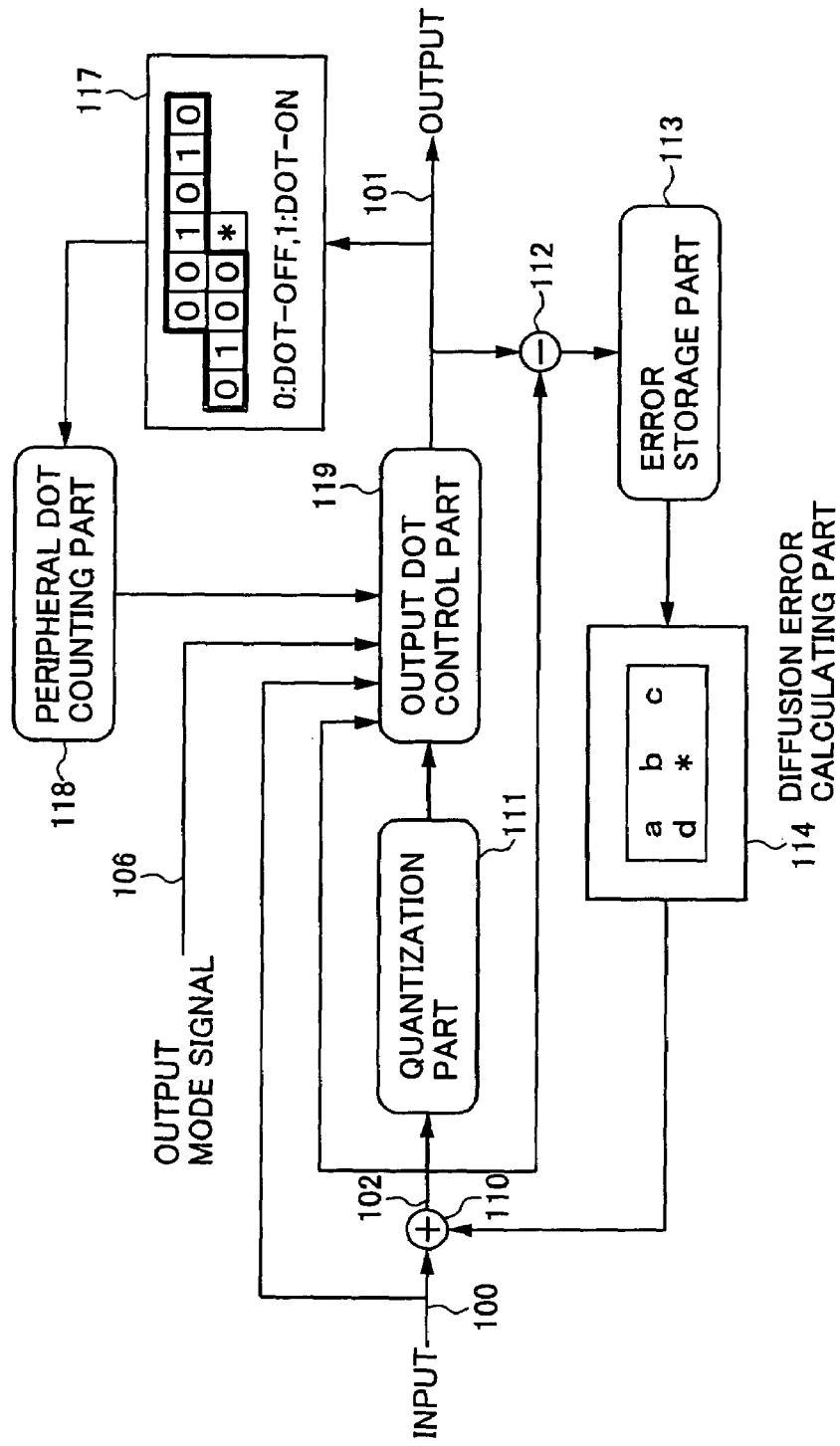
FIG. 13 is a block diagram showing another example of a block configuration of an image processing apparatus according to the present invention.

A block configuration of an image processing apparatus in a seventh embodiment according to the present invention is, as shown in FIG. 13, different from that of the above-described sixth embodiment, in that an output mode signal 106 indicating an output mode is input to the output dot control part 119. This output mode signal 106 is provided from an operation panel not shown in the figure operated by a user, for example. Information stored in the peripheral dot information storage part 117 and operation of the peripheral dot counting part 118 are the same as those of the above-described first embodiment. Processing performed by the output dot control part 119 is the same as that in the above-described sixth embodiment except that the values of parameters A and B for determining the thresholds THR1 and THR2 are changed according to the output mode specified, and, therefore, will now be described using FIG. 12.

In the step S71, the output control part 119 sets the parameter A to a value according to the specified output mode. Further, in the step S78, the output control part 119 sets the parameter B to a value according to the specified output mode. In the seventh embodiment, as the output mode, as shown in FIG. 14, any one of a 'character mode' suitable for outputting images in which shade changing points of characters (or letters) or the like are intended to be reproduced with high resolution, a 'photograph mode' suitable for outputting images having a little shade change such as photographs, a 'character/photograph mode' suitable for outputting images of both characters and photographs, and a 'printed photograph mode' suitable for outputting halftone-dot images such as printed matters. Then, according to the thus-specified output mode, the parameters A and B are set, as shown in FIG. 14.

When the character mode is selected, the parameters A and B are set to 255 as shown in the figure. Accordingly, occurrence of the quantized levels 1 and 2 is not repressed, and the process same as ordinary 4-level error diffusion is executed. Thereby it is possible to form images having superior sharpness.

When the photograph mode is selected, the parameters A and B are set to small values, i.e., 30 and 100, respectively, and occurrence of the quantized levels 1 and 2 is strongly repressed as shown in FIG. 8. Accordingly, it is possible to form images having superior graininess, stability and tonality.

When the character/photograph mode is selected, the parameter A is set to 30, and, thereby, occurrence of the quantized level 1 is strongly repressed, but the parameter B is set to 150 which is somewhat large, and, thereby, occurrence of the quantized level 2 is repressed weakly. Accordingly, it is possible to form satisfactory images for both characters and photographs.

When the printed photograph mode is selected, the parameter A is set to 60 which is large, and thereby, occurrence of the quantized level 1 is weakly repressed, and, the parameter B is set to 255, and thereby, occurrence of the quantized level 2 is not repressed. Accordingly, it is possible to form halftone-dot images such as those of printed matters satisfactorily.

Although each embodiment described above performs 4-level quantization, the present invention can be easily applied to an image processing apparatus which performs multi-level quantization of three levels or five or more levels. For example, when image data is 3-level quantized into 0, 1 and 2, occurrence of the quantized level 1 may be repressed similarly. Further, when image data is 5-level quantized into 0, 1, 2, 3 and 4, occurrence of the quantized levels 1, 2 and 3 is repressed similarly. Also in a case of multi-level quantization of the number of levels more than this, a similar manner may be considered of course.

Figure 20:
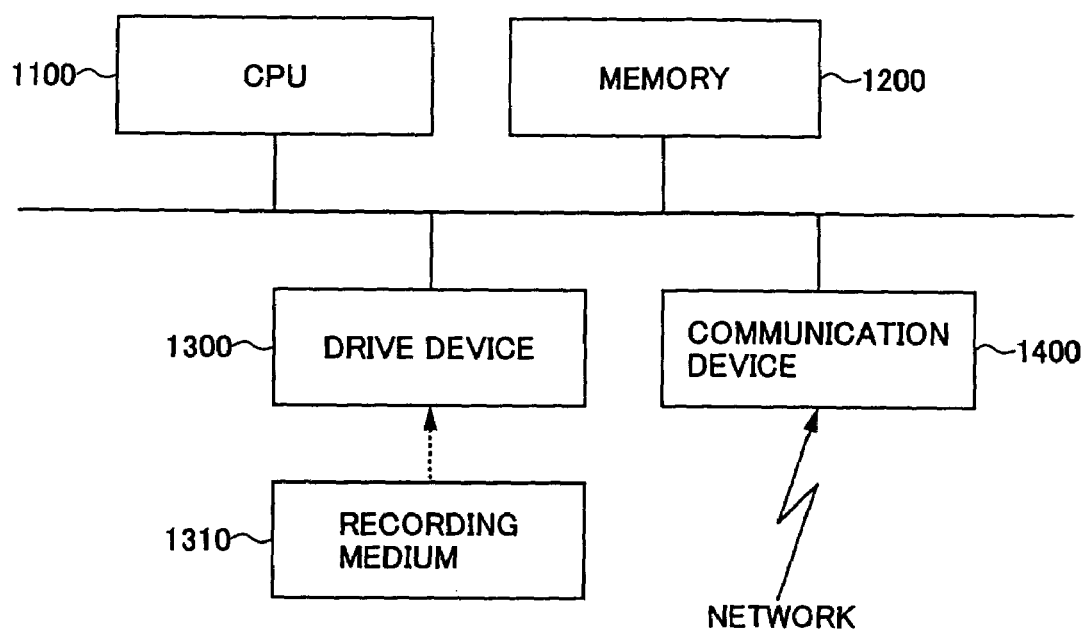
FIG. 20 shows a block diagram of a general-purpose or special-purpose computer by which an image processing apparatus according to the present invention can be achieved.

The image processing apparatus in each of the above-described embodiments and variant embodiment may be achieved by software using a general-purpose or special-purpose computer such as that shown in FIG. 20.

In this case, a program for achieving the functions of the respective parts of the image processing apparatus is read from one of various recording media 1310 such as a floppy disk, an optical disk, a magneto-optical disk, a semiconductor storage device, and so forth through a suitable drive device 1300, or received from an external computer via a network through a communication device 1400, is then loaded in a main memory 1200, and is then executed by a CPU 1100 in a well-known manner.

Accordingly, it is possible to achieve the image processing apparatus according to the present invention by the general-purpose or special-purpose computer. Storage areas of the main memory may be used as line memories and so forth necessary for storing various data, for example.

Such various computer-readable recording media (floppy disk, optical disk, magneto-optical disk, semiconductor storage device, and so forth) in which such a program is recorded are included in the present invention.

The image processing apparatus in each of the above-described embodiments and variant embodiments thereof may be incorporated in apparatuses relating to image formation such as a printer, a display device, and so forth, apparatuses relating to image reading such as a scanner, a facsimile machine, and so forth, and apparatuses relating to both image reading and image formation such as digital copier and so forth.

As one example thereof, a digital copier to which the present invention is applied will now be described (as an eighth embodiment of the present invention).

Eighth Embodiment

Figure 16:
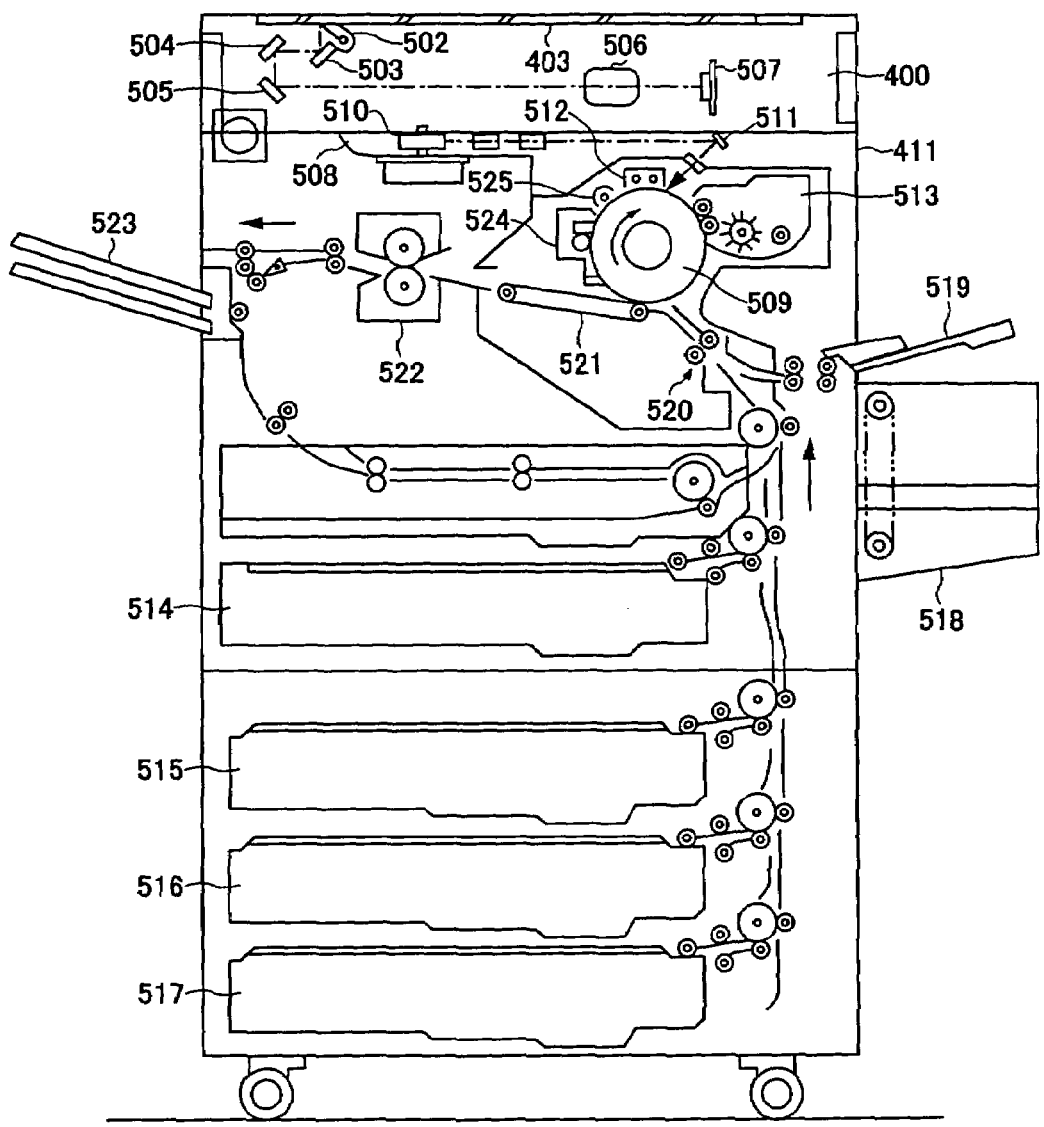
FIG. 16 is a general sectional view showing one example of a digital copier according to the present invention.

FIG. 16 shows a general sectional view of the digital copier in the eighth embodiment.

The digital copier shown in FIG. 16 includes an image reading part 400 which optically scans an original image and reads it, a laser printer 411 which serves as an image forming apparatus, and a circuit part 550 (see FIGS. 17 and 18) not shown in the figure, and an operation panel, also not shown in the figure, for an operator or user to input various instructions to the copier (for example, an instruction of the output mode in the above-described seventh embodiment).

The image reading part 400 illuminates an original image sheet placed on a flat original table 403 by an illuminating lamp 502, forms an image from a reflected light image from the original image sheet onto an image sensor 507 such as a CCD by mirrors 503 through 505 and a lens 506. And also, by sub-scanning the original image sheet by moving the illuminating lamp 502 and mirrors 503 through 505, the image reading part 400 reads image information of the original image sheet, and converts it into an electric image signal. The analog image signal output from the image sensor 507 is input to the circuit part 550 (FIGS. 17, 18), and is processed thereby. Image data output from the circuit part 550 is input to the laser printer 411 which then form an image.

In the laser printer 411, a writing optical unit 508 converts image data input from the circuit part 550 into an optical signal, and exposes an image carrying body made of a photosensitive body, for example, a photosensitive body drum 509. Thereby, an electrostatic latent image corresponding to the original image is formed on the photosensitive body drum 509.

The writing optical unit 508, for example, drives a semiconductor laser according to the above-mentioned image data so as to cause it to emit thus-intensity-modulated laser light, deflects the laser light by a rotational polygon mirror 510, and illuminates the photosensitive body drum 509 by the laser light through an f/θ lens and a reflective mirror 511.

The photosensitive body drum 509 is driven to rotate in a direction indicated by the arrow clockwise by a driving part. After being charged uniformly by a charger 512, the photosensitive body drum 509 is exposed by the writing optical unit 508, and thus has the electrostatic latent image formed thereon.

The electrostatic latent image on the photosensitive body drum 509 is developed by a developing device 513, and becomes a toner image. Further, a paper sheet is supplied by any of a plurality of paper feeding parts 514 through 518 and hand-inserting paper feeding part 519 to a registration roller 520. The registration roller 520 sends out the paper sheet in timing to the toner image on the photosensitive body drum 509.

A transfer belt 521 has a transfer bias applied thereto by a transfer power source, transfers the toner image on the photosensitive body drum 509 onto the paper sheet, and carries the paper sheet. The paper sheet having had the toner image transferred thereto is then carried to a fixing part 522 by the transfer belt 521, and the toner image is fixed onto the paper sheet thereby, which is then ejected to an ejecting tray 523.

The photosensitive body drum 509 is cleaned by a cleaning device 524 after the toner image thereon is transferred, and electricity of the photosensitive body drum 509 is removed by an electricity removal device 525. Thus, the photosensitive body drum 509 is prepared for a subsequent image forming operation.

Figure 17:
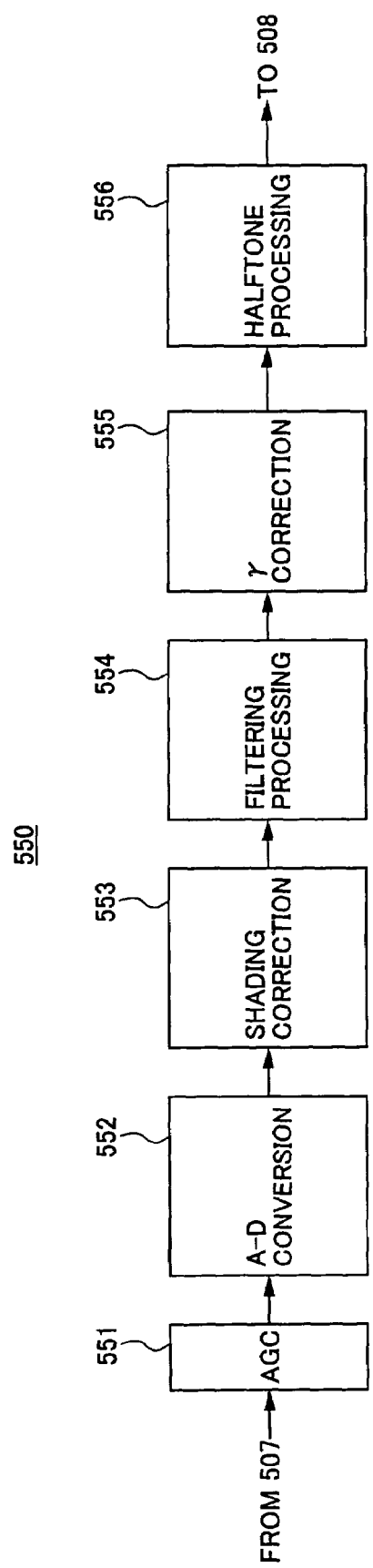
FIGS. 17 and 18 are block diagrams showing examples of a configuration of a circuit part inside of the digital copier shown in FIG. 16.
Figure 18:
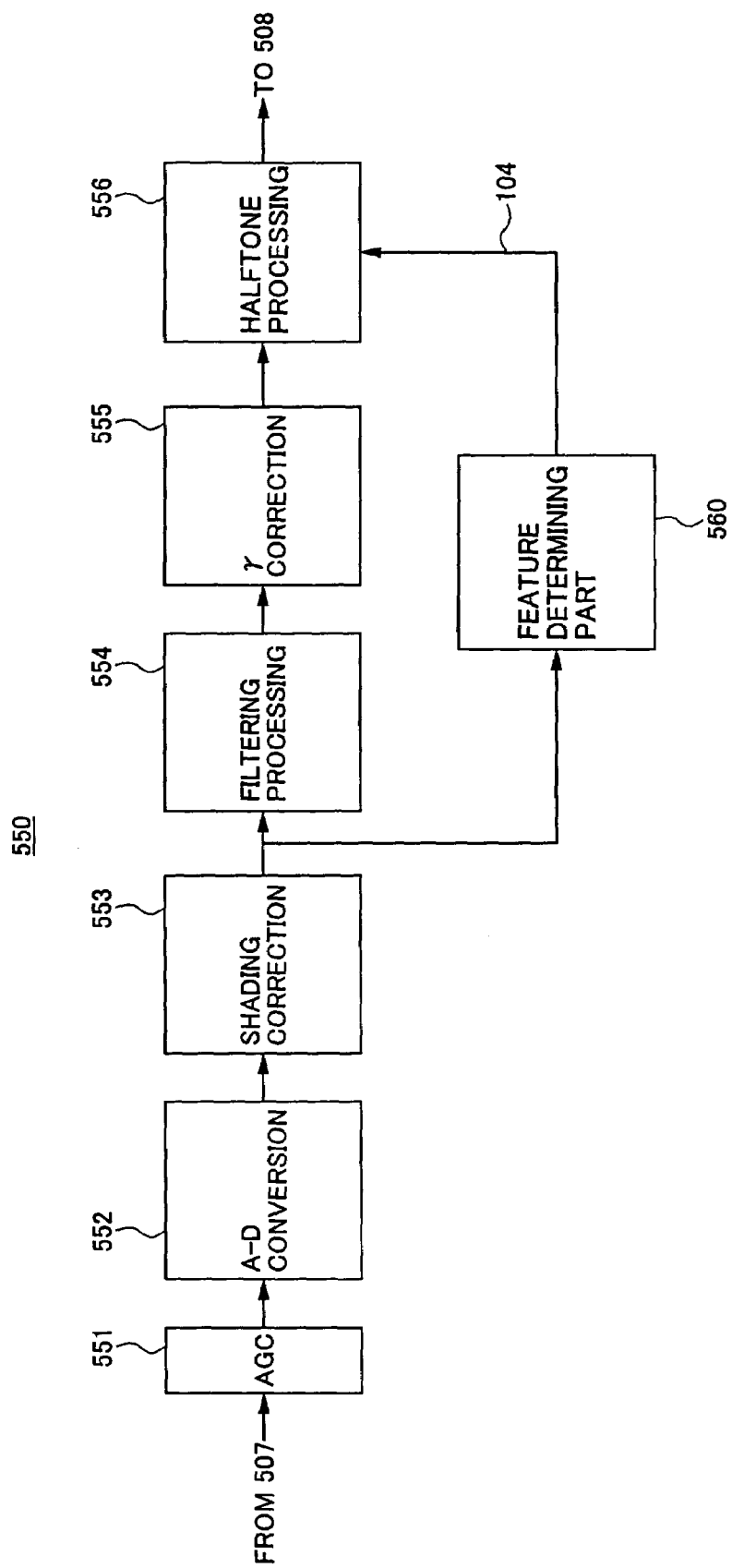

FIG. 17 shows a block diagram after simplifying one example of the above-mentioned circuit part 550 of the digital copier.

Input to the circuit part 550 is, for example, an analog image signal obtained from reading the original image in 600 dpi by the image sensor 507 of the image reading part 400. The level of this analog signal is adjusted by an AGC circuit 551, and, then, an A-D converting circuit 552 converts the thus-obtained analog signal into a digital image signal representing each pixel by 8 bits.

Further, a shading correction circuit 553 corrects for each pixel of the image sensor 507 variation in sensitivity and illumination.

Then, the image data is sent to a filter processing circuit 554, undergoes MTF correction, for example, and then, undergoes smoothing filter processing for representing a halftone image smoothly. The thus-obtained image data is input to a γ (gamma) correction circuit 555 which then performs γ correction on the input image data for converting the image data to have writing shade.

The image data having undergone the γ correction is input to a halftone processing part 556. The image processing apparatus in any of the above-described embodiments and variant embodiments thereof of the present invention is used as this halftone processing part 556

The output image data provided by the halftone processing part 556 is sent to a light-emitting driving control part of a semiconductor laser inside of the above-mentioned writing optical unit 508. Because the halftone processing part 556 executes the above-described multi-level quantization process, it is possible to reproduce the image read from the original image sheet with high image quality.

In a case where the image processing apparatus in any of the above-described fifth and sixth embodiments and variant embodiments thereof is used as the halftone processing part 556, the feature determining part which provides the feature indicating signal 104 indicating distinction between character region/picture region or distinction between edge region/non-edge region may be provided inside the halftone processing part 556 or may be provided antecedent to the halftone processing part 556. For example, the feature determining part 560 may be provided at the position shown in FIG. 18.

Actually, the digital copier can perform processing such as image-size changing processing, background removal processing, flare removal processing, other image edition processing on image data. However, description thereof is omitted.

Further, the present invention can be easily applied also to the digital copier having an image reading part which moves a original table, and a digital copier having an image forming part other than a laser printer An image processing apparatus in another embodiment of the present invention has a configuration in which, although not shown in figures, as a scanner or a facsimile, a reading part such as the image reading part 400 of above-described digital copier is added to the image processing apparatus in any of the above-described first through seventh embodiments and variant embodiments thereof.

An image processing apparatus in another embodiment of the present invention has a configuration in which, although not shown in figures, an image forming part such as the laser printer 411 of above-described digital copier is added to the image processing apertures in any of the above-described first through seventh embodiments and variant embodiments thereof.

The present invention is not limited to the above-described embodiments, and variations and modifications may be made without departing from the scope of the present invention.

The present application is based on Japanese priority application No. 11-353625, filed on Dec. 13, 1999, the entire contents of which are hereby incorporated by reference.

What is claimed is:

1. An image forming method, comprising the steps of:
 a) multi-level quantizing a multi-tone image by an error diffusion method; and
 b) representing each pixel of the thus-quantized image having a quantized level higher than 0 using a dot which is larger as the quantized level thereof is higher,
 wherein occurrence of dots having a specific size is repressed in a specific shade region relating to the dots, and
 wherein a degree of repressing occurrence of the dots having the specific size is changed according to a feature of the image; and wherein occurrence of the dots having the specific size is repressed only for a picture region of the image.

2. An image forming method, comprising the steps of:
 a) multi-level quantizing a multi-tone image by an error diffusion method; and
 b) representing each pixel of the thus-quantized image having a quantized level higher than 0 using a dot which is larger as the quantized level thereof is higher,
 wherein occurrence of dots having a specific size is repressed in a specific shade region relating to the dots, and
 wherein a degree of repressing occurrence of the dots having the specific size is changed according to a feature of the image; and wherein the degree of repressing occurrence of the dots having the specific size is made weaker for a character region of the image than for a picture region of the image.

3. An image forming method, comprising the steps of:
 a) multi-level quantizing a multi-tone image by an error diffusion method; and
 b) representing each pixel of the thus-quantized image having a quantized level higher than 0 using a dot which is larger as the quantized level thereof is higher,
 wherein occurrence of dots having a specific size is repressed in a specific shade region relating to the dots,
 wherein a degree of repressing occurrence of the dots having the specific size is changed according to a feature of the image, and
 wherein occurrence of the dots having the specific size is repressed only for a non-edge region of the image.

4. An image processing method, comprising the steps of:
 a) multi-level quantizing multi-tone image data by an error diffusion method; and
 b) repressing occurrence of one or more specific quantized levels for a specific level region of the image data relating to the one or more specific quantized levels; and
 wherein re-quantization is performed, after the multi-level quantization is performed, in which, for a pixel having a specific quantization level, image data having an error added thereto according to the error diffusion method is compared with a threshold, and a final output value is determined, and
 wherein occurrence of the one or more specific quantized levels is repressed for a medium level region of the image data.

5. The method as claimed in claim 4, wherein re-quantization is performed for the one or more specific quantized levels, occurrence of which is to be repressed.

6. An image processing method, comprising the steps of:
a) multi-level quantizing multi-tone image data by an error diffusion method; and
b) repressing occurrence of one or more specific quantized levels for a specific level region of the image data relating to the one or more specific quantized levels,
wherein re-quantization is performed, after the multi-level quantization is performed, in which, for a pixel having a specific quantization level, image data having an error added thereto according to the error diffusion method is compared with a threshold, and a final output value is determined, and
wherein occurrence of the one or more specific quantized levels is repressed for medium and high level regions of the image data.

7. The method as claimed in claim 6, wherein re-quantization is performed for the one or more specific quantized levels, occurrence of which is to be repressed.

8. An image processing method, comprising the steps of:
a) multi-level quantizing multi-tone image data; and
b) repressing occurrence of one or more specific quantized levels for a specific level region of the image data relating to the one or more specific quantized levels,
wherein a degree of repressing occurrence of the one or more specific quantized levels is changed according to a feature of the image, and
wherein occurrence of the one or more specific quantized levels is repressed only for a picture region of the image.

9. An image processing method, comprising the steps of:
a) multi-level quantizing multi-tone image data; and
b) repressing occurrence of one or more specific quantized levels for a specific level region of the image data relating to the one or more specific quantized levels,
wherein a degree of repressing occurrence of the one or more specific quantized levels is changed according to a feature of the image, and
wherein the degree of repressing occurrence of the one or more specific quantized levels is made weaker for a character region of the image than for a picture region of the image.

10. An image processing method, comprising the steps of:
a) multi-level quantizing multi-tone image data; and
b) repressing occurrence of one or more specific quantized levels for a specific level region of the image data relating to the one or more specific quantized levels,
wherein a degree of repressing occurrence of the one or more specific quantized levels is changed according to a feature of the image, and
wherein occurrence of the one or more specific quantized levels is repressed only for a non-edge region of the image.

11. An image processing apparatus, comprising:
a first part multi-level quantizing multi-level input image data by an error diffusion method; and
a second part repressing occurrence of one or more specific quantized levels for a specific level region of the image data relating to the one or more specific quantized level,
wherein re-quantization is performed, after the multi-level quantization is performed, in which, for a pixel having a specific quantization level, image data having an error added thereto according to the error diffusion method is compared with a threshold, and a final output value is determined, and
wherein said second part represses occurrence of the one or more specific quantized levels for a medium level region of the image data.

12. The apparatus as claimed in claim 11, wherein said second part performs re-quantization for the one or more specific quantized levels, occurrence of which is to be repressed.

13. An image processing apparatus, comprising:
a first part multi-level quantizing multi-level input image data by an error diffusion method; and
a second part repressing occurrence of one or more specific quantized levels for a specific level region of the image data relating to the one or more specific quantized levels,
wherein re-quantization is performed, after the multi-level quantization is performed, in which, for a pixel having a specific quantization level, image data having an error added thereto according to the error diffusion method is compared with a threshold, and a final output value is determined, and
wherein said second part represses occurrence of the one or more specific quantized levels for medium and high level regions of the image data.

14. The apparatus as claimed in claim 13, wherein said second part performs re-quantization for the one or more specific quantized levels, occurrence of which is to be repressed.

15. An image processing apparatus, comprising:
a first part multi-level quantizing multilevel input image data; and
a second part repressing occurrence of one or more specific quantized levels for a specific level region of the image data relating to the one or more specific quantized levels,
wherein said second part changes degrees of repressing occurrence of the one or more specific quantized levels according to a feature of the image, and
wherein said second part represses occurrence of the one or more specific quantized levels only for a picture region of the image.

16. An image processing apparatus, comprising:
a first part multi-level quantizing multi-level input image data; and
a second part repressing occurrence of one or more specific quantized levels for a specific level region of the image data relating to the one or more specific quantized levels,
wherein said second part changes degrees of repressing occurrence of the one or more specific quantized levels according to a feature of the image, and
wherein said second part makes the degrees of repressing occurrence of the one or more specific quantized levels weaker for a character region of the image than for a picture region of the image.

17. An image processing apparatus, comprising:
a first part multi-level quantizing multi-level input image data; and
a second part repressing occurrence of one or more specific quantized levels for a specific level region of the image data relating to the one or more specific quantized levels,
wherein said second part changes degrees of repressing occurrence of the one or more specific quantized levels according to a feature of the image, and
wherein said second part represses occurrence of the one or more specific quantized levels only for a non-edge region of the image.

18. An image processing apparatus, comprising:
a first part multi-level quantizing multi-level input image data; and
a second part repressing occurrence of one or more specific quantized levels for a specific level region of the image data relating to the one or more specific quantized levels, and
wherein said second part changes degrees of repressing occurrence of the one or more specific quantized levels according to a specified output mode.

19. The apparatus as claimed in claim 18, wherein said second part performs re-quantization for the one or more specific quantized levels, occurrence of which is to be repressed.

20. An image processing apparatus, comprising:
a first part adding an error to input image data;
a second part multi-level quantizing the image data to which the error is already added by said first part, using a plurality of quantization thresholds;
a third part re-quantizing the quantized data provided by said second part, into another quantized level, for one or more specific quantized levels, as the need arises, and outputting the thus-obtained data as output image data;
a fourth part obtaining the error to be added to the input image data, from the output image data and image data to which the error is already added by said first part, and providing the thus-obtained error to said first part; and
a fifth part detecting, from the output image data, the number of pixels quantized to be higher than the quantized level 0 in a specific region in the periphery of a target pixel, and providing the thus-obtained number to said third part,
wherein said third part has a signal indicating a feature of an image region to which the target pixel belongs input thereto from the outside, and compares a threshold, relating to each of said one or more specific quantized levels, determined based on a parameter relating to said each of said one or more specific quantized levels determined according to the feature indicated by said signal, the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a degree according to said feature in a specific level region of the input image data relating to said each of said one or more specific quantized levels through the re-quantization by said third part,
wherein said signal indicates whether the image region to which the target pixel belongs is a character region or a picture region, and
wherein said parameter relating to each of said one or more specific quantized levels is determined such that occurrence of said each of said one or more specific quantized levels is repressed only for the picture region.

21. An image processing apparatus, comprising:
a first part adding an error to input image data;
a second part multi-level quantizing the image data to which the error is already added by said first part, using a plurality of quantization thresholds;
a third part re-quantizing the quantized data provided by said second part, into another quantized level, for one or more specific quantized levels, as the need arises, and outputting the thus-obtained data as output image data;
a fourth part obtaining the error to be added to the input image data, from the output image data and image data to which the error is already added by said first part, and providing the thus-obtained error to said first part; and
a fifth part detecting, from the output image data, the number of pixels quantized to be higher than the quantized level 0 in a specific region in the periphery of a target pixel, and providing the thus-obtained number to said third part,
wherein said third part has a signal indicating a feature of an image region to which the target pixel belongs input thereto from the outside, and compares a threshold, relating to each of said one or more specific quantized levels, determined based on a parameter relating to said each of said one or more specific quantized levels determined according to the feature indicated by said signal, the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a degree according to said feature in a specific level region of the input image data relating to said each of said one or more specific quantized levels through the re-quantization by said third part,
wherein said signal indicates whether the image region to which the target pixel belongs is a character region or a picture region, and
wherein said parameter relating to each of the one or more specific quantized levels is determined such that the degree of repressing occurrence of said each of said one or more specific quantized levels is made weaker for the character region than for the picture region.

22. An image processing apparatus, comprising:
a first part adding an error to input image data;
a second part multi-level quantizing the image data to which the error is already added by said first part, using a plurality of quantization thresholds;
a third part re-quantizing the quantized data provided by said second part, into another quantized level, for one or more specific quantized levels, as the need arises, and outputting the thus-obtained data as output image data;
a fourth part obtaining the error to be added to the input image data, from the output image data and image data to which the error is already added by said first part, and providing the thus-obtained error to said first part; and
a fifth part detecting, from the output image data, the number of pixels quantized to be higher than the quantized level 0 in a specific region in the periphery of a target pixel, and providing the thus-obtained number to said third part,
wherein said third part has a signal indicating a feature of an image region to which the target pixel belongs input thereto from the outside, and compares a threshold, relating to each of said one or more specific quantized levels, determined based on a parameter relating to said each of said one or more specific quantized levels determined according to the feature indicated by said signal, the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a degree according to said feature in a specific level region of the input image data relating to said each of said one or more specific quantized levels through the re-quantization by said third part, wherein said signal indicates whether the image region to which the target pixel belongs is an edge region or a non-edge region, and wherein said parameter relating to each of the one or more specific quantized levels is determined such that occurrence of said each of said one or more specific quantized levels is repressed only for the non-edge region.

23. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, into another quantized level, for one or more specific quantized levels, as the need arises, and outputting the thus-obtained data as an output image data;

a fourth part obtaining the error to be added to the input image data, from the output image data and image data to which the error is already added by said first part, and providing the thus-obtained error to said first part; and a fifth part detecting, from the output image data, the number of pixels quantized to be higher than the quantized level 0 in a specific region in the periphery of a target pixel, and providing the thus-obtained number to said third part, wherein said third part has a signal indicating an output mode input thereto from the outside, and compares a threshold, relating to each of said one or more specific quantized levels, determined based on a parameter relating to said each of said one or more specific quantized levels determined according to the output mode indicated by said signal, the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a degree according to said output mode in a specific level region of the input image data relating to said each of said one or more specific quantized levels through the re-quantization by said third part.

24. The image processing apparatus as claimed in claim 23, wherein:

said second part performs 4-level quantization;

the re-quantization performed by said third part is performed for the quantized level 1; and occurrence of the quantized level 1 is repressed in a medium level region of the input image data.

25. The image processing apparatus as claimed in claim 23, wherein:

said second part performs 4-level quantization;

the re-quantization performed by said third part is performed for the quantized level 1 and quantized level 2;

occurrence of the quantized level 1 is repressed in a medium level region of the input image data; and occurrence of the quantized level 2 is repressed in a high level region of the input image data.

26. The image processing apparatus as claimed in claim 23, further comprising a sixth part which forms an image, from the image output data, using dots for pixels which dots are larger as the pixels have higher quantized levels.

27. The image processing apparatus as claimed in claim 23, further comprising a sixth part generating the input image data by optically scanning an original.

28. The image processing apparatus as claimed in claim 23, further comprising:

a sixth part generating the input image data by optically scanning an original; and a seventh part forming an image, from the image output data, using dots for pixels which dots are larger as the pixels have higher quantized levels.

29. A computer-readable recording medium storing therein a program for causing a computer to carry out the function of each part of the image processing apparatus as claimed in claim 23.

30. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, to another quantized level, for one or more specific quantized levels other than the highest quantized level and quantized level 0, as the need arises, and outputting the thus-obtained data as an output image data;

a fourth part obtaining the error to be added to the input image data, from the output image data and image data to which the error is already added by said first part, and providing the thus-obtained error to said first part; and a fifth part detecting, from the output image data, the number of pixels quantized to be higher than the quantized level 0 in a specific region in the periphery of a target pixel, and providing the thus-obtained number to said third part, wherein said third part compares a threshold, relating to each of said one or more specific quantized levels, determined based on the number provided by said fifth part, with the level of the image data to which the error is already added, and, thereby, determines whether re-quantization for said each of said one or more specific quantized levels is necessary, occurrence of each of said one or more specific quantized levels being repressed in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1, and occurrence of the quantized level 1 is repressed in a medium level region of the input image data.

31. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, into another quantized level, for one or more specific quantized levels other than the highest quantized level and quantized level 0, as the need arises, and outputting the thus-obtained data as output image data;

a fourth part obtaining the error to be added to the input image data, from the output image data and image data to which the error is already added by said first part, and providing the thus-obtained error to said first part; and a fifth part detecting, from the output image data, the number of pixels quantized to be higher than the quantized level 0 in a specific region in the periphery of a target pixel, and providing the thus-obtained number to said third part, wherein said third part compares a threshold, relating to each of said one or more specific quantized levels, determined based on the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1, and occurrence of the quantized level 1 is repressed in a medium level region of the input image data.

32. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, into another quantized level, for one or more specific quantized levels other than the highest quantized level and quantized level 0, as the need arises, and outputting the thus-obtained data as an output image data;

a fourth part obtaining the error to be added to the input image data, from the output image data and image data to which the error is already added by said first part, and providing the thus-obtained error to said first part; and a fifth part detecting, from the output image data, the number of pixels for each quantized level in a specific region in the periphery of a target pixel, and providing the thus-obtained number to said third part, wherein said third part compares a threshold, relating to each of said one or more specific quantized levels, determined based on the total number of pixels of each of said one or more specific quantized levels and one or more other quantized levels near to said each of the one or more specific quantized levels and the level of the input image data, with the level of the image data to which the error is already added, and, thereby, determines whether re-quantization for said each of said one or more specific quantized levels is necessary, occurrence of each of said one or more specific quantized levels being repressed in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1, and occurrence of the quantized level 1 is repressed in a medium level region of the input image data.

33. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, into another quantized level, for one or more specific quantized levels, as the need arises, and outputting the thus-obtained data as output image data;

a fourth part obtaining the error to be added to the input image data, from the output image data and image data to which the error is already added by said first part, and providing the thus-obtained error to said first part; and a fifth part detecting, from the output image data, the number of pixels quantized to be higher than the quantized level 0 in a specific region in the periphery of a target pixel, and providing the thus-obtained number to said third part, wherein said third part has a signal indicating a feature of an image region to which the target pixel belongs input thereto from the outside, and compares a threshold, relating to each of said one or more specific quantized levels, determined based on a parameter relating to said each of said one or more specific quantized levels determined according to the feature indicated by said signal, the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a degree according to said feature in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1, and occurrence of the quantized level 1 is repressed in a medium level region of the input image data.

34. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, to another quantized level, for one or more specific quantized levels other than the highest quantized level and quantized level 0, as the need arises, and outputting the thus-obtained data as an output image data;

a fourth part obtaining the error to be added to the input image data, from the output image data and image data to which the error is already added by said first part, and providing the thus-obtained error to said first part; and a fifth part detecting, from the output image data, the number of pixels quantized to be higher than the quantized level 0 in a specific region in the periphery of a target pixel, and providing the thus-obtained number to said third part, wherein said third part compares a threshold, relating to each of said one or more specific quantized levels, determined based on the number provided by said fifth part, with the level of the image data to which the error is already added, and, thereby, determines whether re-quantization for said each of said one or more specific quantized levels is necessary, occurrence of each of said one or more specific quantized levels being repressed in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1 and quantized level 2, occurrence of the quantized level 1 is repressed in a medium level region of the input image data, and occurrence of the quantized level 2 is repressed in a high level region of the input image data.

35. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, into another quantized level, for one or more specific quantized levels other than the highest quantized level and quantized level 0, as the need arises, and outputting the thus-obtained data as output image data;

a fourth part obtaining the error to be added to the input image data, from the output image data and image data to which the error is already added by said first part, and providing the thus-obtained error to said first part; and a fifth part detecting, from the output image data, the number of pixels quantized to be higher than the quantized level 0 in a specific region in the periphery of a target pixel, and providing the thus-obtained number to said third part, wherein said third part compares a threshold, relating to each of said one or more specific quantized levels, determined based on the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1 and quantized level 2, occurrence of the quantized level 1 is repressed in a medium level region of the input image data, and occurrence of the quantized level 2 is repressed in a high level region of the input image data.

36. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, into another quantized level, for one or more specific quantized levels other than the highest quantized level and quantized level 0, as the need arises, and outputting the thus-obtained data as an output image data;

a fourth part obtaining the error to be added to the input image data, from the output image data and image data to which the error is already added by said first part, and providing the thus-obtained error to said first part; and a fifth part detecting, from the output image data, the number of pixels for each quantized level in a specific region in the periphery of a target pixel, and providing the thus-obtained number to said third part, wherein said third part compares a threshold, relating to each of said one or more specific quantized levels, determined based on the total number of pixels of each of said one or more specific quantized levels and one or more other quantized levels near to said each of the one or more specific quantized levels and the level of the input image data, with the level of the image data to which the error is already added, and, thereby, determines whether re-quantization for said each of said one or more specific quantized levels is necessary, occurrence of each of said one or more specific quantized levels being repressed in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1 and quantized level 2, occurrence of the quantized level 1 is repressed in a medium level region of the input image data, and occurrence of the quantized level 2 is repressed in a high level region of the input image data.

37. An image processing apparatus, comprising:

a first part adding an error to input image data;

a second part multi-level quantizing the image data to which the error is already added by said first part, using a plurality of quantization thresholds;

a third part re-quantizing the quantized data provided by said second part, into another quantized level, for one or more specific quantized levels, as the need arises, and outputting the thus-obtained data as output image data;

a fourth part obtaining the error to be added to the input image data, from the output image data and image data to which the error is already added by said first part, and providing the thus-obtained error to said first part; and a fifth part detecting, from the output image data, the number of pixels quantized to be higher than the quantized level 0 in a specific region in the periphery of a target pixel, and providing the thus-obtained number to said third part, wherein said third part has a signal indicating a feature of an image region to which the target pixel belongs input thereto from the outside, and compares a threshold, relating to each of said one or more specific quantized levels, determined based on a parameter relating to said each of said one or more specific quantized levels determined according to the feature indicated by said signal, the number provided by said fifth part and the level of the input image data, with the level of the image data to which the error is already added, and, thereby, determines whether re-quantization for said each of said one or more specific quantized levels is necessary, occurrence of each of said one or more specific quantized levels being repressed in a degree according to said feature in a specific level region of the input image data relating to said each of said one or more specific quantized levels through the re-quantization by said third part, wherein re-quantization is performed, after the multi-level quantization is performed, in which, for a pixel having a specific quantization level, image data having an error added thereto according to the error diffusion method is compared with a threshold, and a final output value is determined, and wherein:

said second part performs 4-level quantization, the re-quantization performed by said third part is performed for the quantized level 1 and quantized level 2, occurrence of the quantized level 1 is repressed in a medium level region of the input image data, and occurrence of the quantized level 2 is repressed in a high level region of the input image data.

* * * * *